United States Patent
Piaseczny et al.

(10) Patent No.: US 11,144,376 B2
(45) Date of Patent: Oct. 12, 2021

(54) VETO-BASED MODEL FOR MEASURING PRODUCT HEALTH

(71) Applicant: Microsoft Technology Licensing, LLC, Redmond, WA (US)

(72) Inventors: Michal Krzysztof Piaseczny, Bellevue, WA (US); Paras Pankaj Kapadia, Seattle, WA (US); Amog Rajenderan, Seattle, WA (US); Hani Saliba, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 191 days.

(21) Appl. No.: 16/195,524

(22) Filed: Nov. 19, 2018

(65) Prior Publication Data
US 2020/0159607 A1     May 21, 2020

(51) Int. Cl.
*G06F 11/00* (2006.01)
*G06F 11/07* (2006.01)
*G06F 11/36* (2006.01)

(52) U.S. Cl.
CPC ...... *G06F 11/0754* (2013.01); *G06F 11/0709* (2013.01); *G06F 11/3612* (2013.01)

(58) Field of Classification Search
CPC .............. G06F 11/0754; G06F 11/0709; G06F 11/3612
See application file for complete search history.

(56) References Cited

U.S. PATENT DOCUMENTS

| 9,606,894 | B2 * | 3/2017 | Della Corte | ........ G06F 11/3612 |
| 9,979,675 | B2 | 5/2018 | Patil et al. | |
| 10,503,580 | B2 * | 12/2019 | Musuvathi | ............ G06F 11/079 |
| 2013/0305093 | A1 * | 11/2013 | Jayachandran | ....... G06F 11/079 714/37 |
| 2014/0033055 | A1 | 1/2014 | Gardner et al. | |
| 2016/0364282 | A1 * | 12/2016 | Baron | ................. G06F 11/0751 |
| 2017/0109379 | A1 | 4/2017 | Crawford et al. | |
| 2018/0027088 | A1 | 1/2018 | Zou et al. | |
| 2019/0018723 | A1 * | 1/2019 | Maurer | ............... G06F 11/0754 |
| 2019/0034254 | A1 * | 1/2019 | Nataraj | ................. G06F 11/079 |

OTHER PUBLICATIONS

"International Search Report and Written Opinion Issued in PCT Application No. PCT/US19/061049", dated May 7, 2020, 10 Pages.

* cited by examiner

*Primary Examiner* — Philip Guyton
(74) *Attorney, Agent, or Firm* — Schwegman Lundberg & Woessner, P.A.

(57) ABSTRACT

The performance of a cloud-based software product over time is determined by collecting telemetry data representing whether different features of online sessions of the software product are operating properly. The telemetry data represents shared performance metrics of the software product across different participants and components participating in an online session. The collected telemetry data is correlated with session identifiers identifying the online session from which the telemetry data was collected. The telemetry data for an online session is processed to establish a unit of failure when the telemetry data indicates that the online session operated outside of predefined performance metrics. The unit of failure is a function of vetoes applied to a candidate list of online sessions indicating that the online session may have problems. The performance of the software product may be determined as a function of the unit of failure over time.

18 Claims, 15 Drawing Sheets

| TEAM | SCENARIO | REPORT NAME | DESCRIPTION | LINK |
|---|---|---|---|---|
| FILE IO | CO-AUTH | CO-AUTH RELIABILITY | RELIABILITY OF REQUESTS TO JOIN CO-AUTH AND SYNC THE EDITOR'S TABLE WITH THE SERVICE | HTTPS://METRICAL.AZU |
| FILE IO | CO-AUTH | RTC RELIABILITY | RELIABILITY OF RTC SET-UP (PROPERTYGET, FIND SESSION, OPEN CONNECTION) AND TRANSMISSION (CONTENT UPDATE, PRESENCE) | HTTPS://METRICAL.AZU |
| FILE IO | SAVE | LOCAL SAVE RELIABILITY | RELIABILITY OF SAVE OPERATION TO LOCAL COPY IN ODC | HTTPS://METRICAL.AZU |
| FILE IO | SAVE | SYNC/UPLOAD RELIABILITY | RELIABILITY OF UPLOAD TO HOST + DOWNLOAD OF NEW BASE VERSION | HTTPS://METRICAL.AZU |
| POWERPOINT | SAVE | SAVE RELIABILITY | RELIABILITY OF APP + FILE IO SAVE TO LOCAL COPY | HTTPS://MSIT.POWER.B |
| POWERPOINT | CO-AUTH | MERGE SUCCESS | SUCCESS OF MERGE OPERATION | HTTPS://AVOCADO/REP |
| POWERPOINT | CO-AUTH | RTC PERF | PER METRICS FOR REAL-TIME CHANNEL PROPAGATION | HTTPS://AVOCADO/REP |
| POWERPOINT | CO-AUTH | MTTF DASHBOARD | USER INTERRUPTION RATE IN CO-AUTHORING AND SOLO EDITING | HTTP://OFFICE/15/METR |
| EXCEL | CO-AUTH | CO-AUTH SHIP DASHBOARD | SHIP-METRICS FOR RING PROMOTION | HTTPS://INSIGHTS/REP? |
| WORD | CO-AUTH | MTTF DASHBOARD | USER INTERRUPTION RATE IN CO-AUTHORING | LINK |
| FILE IO | CO-AUTH | OCS TRANSITION | OCS TRANSITION LATENCY | HTTPS://AVOCADO/REP |
| PPT | CO-AUTH | PPT REAL-TIME COLLABORATION | RTT, PRESENCE AND OCS LATENCY | HTTPS://MICROSOFT.S |
| WORD | CO-AUTH | RTC PACKET DATA | PACKAGE LOSS RATE FOR WORD RTT | HTTP://OFFICE/15/METR |
| WAC | CO-AUTH | KPI DASHBOARD | USAGE AND RELIABILITY COUNTS FOR THE WAC RTC SERVICE | HTTP://OCS/GONOGO/ |
| WAC | CO-AUTH | OCS GO/NO-GO DASHBOARD | RELIABILITY AND PERFORMANCE OF CURRENT OCS BUILDS IN EACH RING | HTTP://OCS/PERF/ |
| WAC | CO-AUTH | OCS PERF DASHBOARD | BREAKDOWN OF EACH COMPONENT OF OCS SESSION START (NEEDS UPDATING) | LINK |
| WORD | CO-AUTH | RT COLLAB DEAD AND ALIVE RATIOS | AN INDICATOR OF HOW MUCH OF THE CONTENT THAT SHOULD BE COMING IN REAL-TIME IS COMING IN REAL-TIME | LINK |
| WORD | CO-AUTH | RT COLLAB AVAILABILITY | AVAILABILITY IS THE RATIO OF HOW OFTEN WE ARE ABLE TO TAKE ADVANTAGE OF THE RTT CHANNEL WHEN IT IS PROVIDED TO USE BY CSI | LINK |

FIG. 2 (PRIOR ART)

```
Function generateCASH() {
    GetCandidateSessions()
    | join kind=leftouter (Veto_FileIO_Save(ago(30d), now()
        | extend Veto_FileIO_save=true) on Session_ID
    | join kind=leftouter (Veto2() | extend Veto2 = true) on Session_Id
    | join kind=leftouter (Veto03() | extend Veto3 = true) on Session_Id
    | extend IsVetoed = Veto_FileIO_Save or Veto2 or Veto3
    | summarize dcount(Session_Id) by IsVetoed, Veto_FileID_Save, Veto2, Veto3,
        bin(Event_Time, Id), App_Name, App_Platform, IS ActiveCoauthSession
}
```

602 →

| ISACTIVECOAUTHSESSION | EVENT/APP/PLATFORM | VETO_FILEIO_SAVE | VETO2 | VETO3 | ISVETOED | DCOUNT_SESSION_ID |
|---|---|---|---|---|---|---|
| TRUE | ... | TRUE | | | TRUE | 1 |
| FALSE | ... | TRUE | TRUE | | TRUE | 1 |
| TRUE | ... | | | TRUE | TRUE | 1 |

FIG. 6

| VETO_FILEIO_SAVE | VETO_EXCEL_COAUTH_INTERRUPTION | VETO_WORD_SAVE | VETO_WORD_RTC_ALIVE_RATIO | EVENT_TIME | APP_NAME | APP_PLATFORM | ISACTIVE_COAUTH_SESSION | DISCOUNT_SESSION_ID | ISVETOED |
|---|---|---|---|---|---|---|---|---|---|
|  |  |  |  | 2018-09-19 00:00:00.0000000 | POWERPOINT | WIN32 | 1 | 636 | 0 |
|  | 1 |  |  | 2018-09-20 00:00:00.0000000 | EXCEL | WIN32 | 1 | 102 | 1 |
|  |  |  | 1 | 2018-09-20 00:00:00.0000000 | WORD | WIN32 | 1 | 182 | 1 |
|  |  |  |  | 2018-09-20 00:00:00.0000000 | POWERPOINT | WIN32 | 1 | 560 | 0 |

FIG. 7

| ISACTIVECOAUTH SESSION | EVENT_TIME | APP_NAME | APP_PLATFORM | ISVETOED | DCOUNT_SESSION_ID | ATTRIBUTE | VALUES |
|---|---|---|---|---|---|---|---|
| TRUE | 10/16/2018 0:00 | POWERPOINT | WIN32 | TRUE | 1 | VETO_FILEIO_SAVE | TRUE |
| TRUE | 10/16/2018 0:00 | POWERPOINT | WIN32 | TRUE | 1 | VETO3 | TRUE |
| FALSE | 10/17/2018 0:00 | WORD | ANDROID | TRUE | 1 | VETO_FILEIO_SAVE | TRUE |
| FALSE | 10/17/2018 0:00 | WORD | ANDROID | TRUE | 1 | VETO2 | TRUE |

FIG. 12

VETO-BASED MODEL FOR MEASURING PRODUCT HEALTH

BACKGROUND

Online services such as cloud-based productivity applications rely upon reliable service for user adoption. A first-class online experience eliminates slow change latencies and upload failures, manages conflicts, and maximizes scalability. However, when there are problems with such services, identifying the source of problems is difficult, particularly where the problems occur at points outside of a particular service provider's domain. This makes identifying and fixing the problem quite difficult.

To address such issues, system components have been instrumented with comprehensive reliability telemetry that is used to allow a service provider to detect an anomaly and to infer from the detected anomaly that a problem has occurred and the nature of that problem. However, when using online services such as cloud-based applications, there are many different system components and it is difficult to collect and to sort the telemetry signals to meaningfully assess the quality of the users' online experiences. At the most fundamental level, the service provider needs to know whether the users are having good experiences with the products and, if not, what the problem is so that it may be fixed immediately.

Previous approaches to addressing user online experience use metrics like user experience mean time to failure (UX MTTF), interruption rate, etc., and have been found to be insufficient in capturing all aspects of the user experience or simply do not collect actionable data. Without the ability to determine whether users are having a good experience with online applications, it is hard for online service providers to determine whether their online products are robust enough to meet customer requirements.

To make matters even more complicated, it is very difficult to measure the various aspects of a good experience with an online product, such as a co-authoring product, even when many signals have been collected using telemetry. The customer's experience with an online service is a product of many components working together. The quality of all of these components working together is what the customer experiences, not the quality of a particular individual component. Many individual product development teams may be responsible for owning many discrete components, often layered very far apart, which makes coordination difficult. Also, a single component telemetry signal in isolation has a different meaning when combined with signals (often cascading out) across the software stack. Moreover, in a client/server system, the server data is often viewed without context into the client behavior in response to server behavior.

For these and other reasons, previous solutions to measuring and fixing product quality have typically measured the health of individual components and focused on improving the reliability of each individual component. While this approach certainly makes the individual components more reliable (and still needs to be done), the user only sees whether the entire online service is performing reliably, not whether individual components perform reliably.

Techniques are desired for measuring the user's experience and using the user's experience data to help identify where the problems are occurring during the use of an online service.

SUMMARY

Various details for the embodiments of the inventive subject matter are provided in the accompanying drawings and in the detailed description text below. It will be understood that the following section provides summarized examples of some of these embodiments.

The following description outlines a technique for effectively answering the question of how often a user has a good experience with an online product by defining a good experience with the online product, inventorying the telemetry signals needed for measuring performance of the online product, and providing a basis for combining the telemetry signals into one or more meaningful metrics. The metric(s) may then be displayed on a dashboard that focuses on the metric(s) and the top Quality of Experience issues impacting such metric(s).

In sample embodiments, the systems and methods described herein provide an improved telemetry metric for characterizing the quality of an online service experience for users of cloud services-based productivity applications such as co-authoring services. Customer experiences with such cloud services-based depend on factors such as fast propagation of changes, no merge conflicts, and the ability to see the presence of other people. While various components may have instrumented comprehensive reliability telemetry, there is a need for a comprehensive metric that covers the cloud-based productivity services in a unified way across the various components (e.g., word processing and spreadsheet applications). Aspects of the systems and methods described herein include creating a cross organization and team shared metric that covers different teams, component owners, and areas across an organization, moving the product quality measurement closer to the user, and enabling fast iteration on identified problems such that each telemetry signal can be tweaked and evolved as understandings and goals change.

Sample embodiments described herein address these issues by creating a metric that begins with a list of "sessions" of the online product that contain a session identifier, metadata about the session, and why the session was chosen as part of the candidate list for potential problems. The system then applies "vetoes" onto this candidate list. As described in more detail below, vetoes are signals provided by components and/or owners that identify the problem. The signals include session identifiers when the components and/or service area behaved in a non-ideal manner (i.e., outside of predefined performance metrics). Vetoes may be simple (an error was thrown) or nuanced (a change did not make it to another user in under X seconds) as required. Any single veto applied to a session vetoes the entire session. The combination of candidate sessions potentially invalidated with a multitude of vetoes enables the service operator to gain a more holistic view into the product health and a much closer insight into the customer experience.

Such a system improved upon previous solutions by creating a cross-organization/team shared performance metric that creates a mechanism for a more holistic quality view of the product by making the interactions between complex components easier to see. The product quality measurement is moved closer to the customer and brings server quality into the client view by joining client sessions to server data. In turn, such features allow each telemetry signal to be tweaked and evolved rapidly as understandings and goals change.

In sample embodiments, the above-mentioned and other features are provided by a computer-implemented method of determining the performance of a cloud-based software product over time. Such a method includes collecting telemetry data representing whether different features of online sessions of the software product are operating properly. The telemetry data represents shared performance metrics of the software product across different participants and components participating in an online session. The collected telemetry data is correlated with session identifiers identifying the online session from which the telemetry data was collected. The telemetry data for an online session is processed to establish a unit of failure when the telemetry data indicates that the online session operated outside of predefined performance metrics. The performance of the software product may then be determined as a function of the unit of failure over time.

In particular implementations of the sample embodiments, the methods include a user defining a good experience with the software product using user experience metrics for the software product, inventorying telemetry data needed for measuring performance of the software product, and providing a basis for combining the telemetry data into the shared performance metrics. The unit of failure represents top Quality of Experience issues impacting the shared performance metrics. Creating a shared performance metric begins with a candidate list of online sessions of the software product potentially with performance outside of the predefined performance metrics. In the sample embodiments, the candidate list of online sessions contains a session identifier, metadata about the online sessions, and why each online session was chosen as part of a candidate list of online sessions.

In other implementations of the sample embodiments, the telemetry data is processed applying vetoes to the candidate list. The vetoes are signals provided by components and/or owners of the software product that identify a problem and include session identifiers when the components and/or a service area behave outside of the predefined performance metrics. A number of online sessions potentially invalidated with a multitude of vetoes may be combined to generate the unit of failure. In the case of using aggregated percentiles to determine whether the software product is operating outside of the predefined performance metrics, the percentiles are translated to vetoes by selecting a set of session data with observed values M, defining a veto with a maximum target metric value T at a specific percentile P, computing an actual metric value A of the session data at percentile P, and producing a veto if $T<M<A$ for each observed value M in the session data.

In other implementations of the sample embodiments, online sessions that have been marked as possibly not operating properly by vetoes are identified and whether the identified online sessions satisfy the unit of failure is determined. The performance of the software product is then calculated as a function of the vetoes. In the sample embodiments, a veto-based health table for the software product is generated by processing the vetoes. Visualization software accesses the data in the veto-based health table to generate dashboard views representative of user experiences with the software product from values stored in the veto-based health table. A final veto calculation table for the software product may be created as a series of joins between data from online sessions and column data resulting from vetoes of the online sessions. The data in the final veto calculation table may then be aggregated by unique session identifier to provide a data collection correlated with the vetoes for visualization as an indication of the function of the software product over time. Also, the telemetry event data from an online session that has been vetoed may be functionally joined with corresponding data from a server log using the session identifier for the online session to generate a data table. The vetoed session may then be recategorized to an owner of the server log data for server issues relating to the vetoed session.

As discussed herein, the logic, commands, or instructions that implement aspects of the methods described above may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below. Such systems and computer-readable media including instructions for implementing the methods described herein also constitute sample embodiments.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 2 illustrates a chart including a conventional collection of health metrics for components of a cloud-based productivity service where every metric is per operation with no common baseline or definitions.

FIG. 6 illustrates an intermediate table that is aggregated on the basis of the unique session IDs to provide numbers that may be visualized.

FIG. 7 illustrates a final calculated table derived from the aggregated telemetry data.

FIG. 12 illustrates a final table including additional metadata identifying the product and the product platform pivoted on the vetoed attribute.

DETAILED DESCRIPTION

The following description with respect to FIGS. 1-14 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

The functions described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

The veto-based model for measuring health of a cloud-based productivity product in a sample embodiment relies upon a comprehensive telemetry system that is instrumented into software applications that collect data regarding events from the field during product usage. The collected data is then forwarded, correlated, and coalesced for rich data analysis using the techniques described herein.

For the purposes of description, it is assumed that a telemetry system of the type described in U.S. Pat. No. 9,979,675 and illustrated in FIG. 1 or of the type described in US 2017/0109379 is being used to collect the telemetry data. The contents of these patent documents are hereby incorporated by reference. Such systems collect events with a strong common schema (and additional flexible data fields), which are instrumented across the different layers of the application software stack for collection of the telemetry data described herein.

Figure 1:
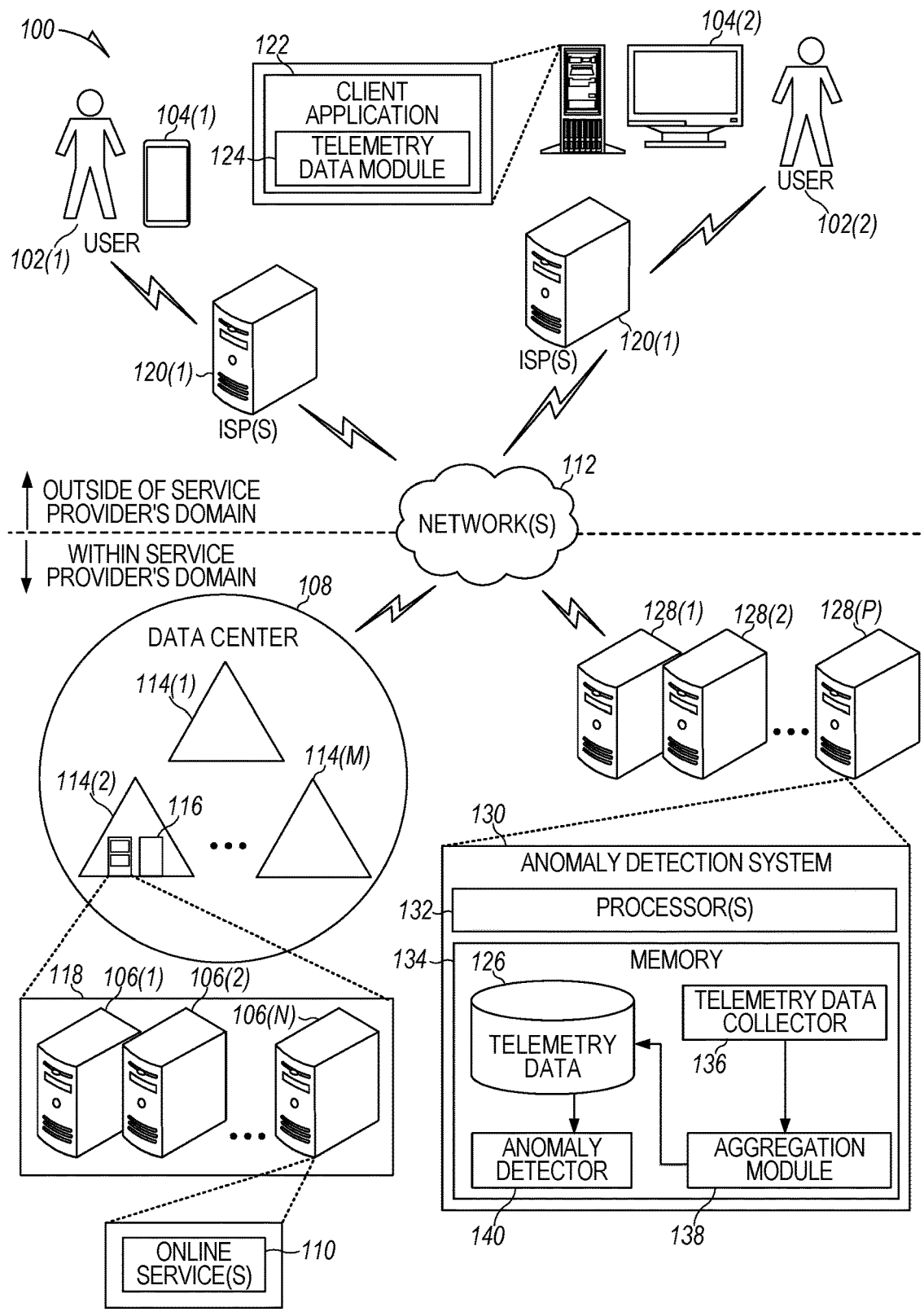
FIG. 1 is a system diagram of a conventional environment for implementing an anomaly detection system for an online service that uses telemetry data.

FIG. 1 illustrates an example environment 100 for implementing an anomaly detection system for an online service that utilizes telemetry data. In the environment 100, a first user 102(1) and a second user 102(2) (collectively "users 102") represent a plurality of users 102 that can utilize respective client computing devices 104(1) and 104(2) (collectively "client computing devices 104") to access one or more servers 106(1), 106(2), . . . , 106(N) (collectively "server(s) 106") of a data center 108 that provides one or more online services 110. The online service(s) 110 can include, without limitation, a personal information management (PIM) service, such as an email service, a web-hosting service, a storage service, a virtual machine service, a business productivity service (e.g., a co-authoring service), an entertainment service (e.g., a music service, a video service, a gaming service, etc.), a personal productivity service (e.g., a travel service), a social networking service, or any similar cloud-based service.

The terms "users," "consumers," "customers," or "subscribers" can be used interchangeably herein to refer to the users 102, and one or more users 102 can subscribe to, or otherwise register for, access to one or more of the online service(s) 110 as a "tenant" of the online service(s) 110. In this regard, a tenant can comprise an individual user 102 or a group of multiple users 102, such as when an enterprise with hundreds of employees registers as a tenant of the online service(s) 110. Accordingly, the data center 108 can utilize a database or a similar data structure to manage registered tenants of the online service(s) 110, including management of access credentials for individual users 102.

The client computing devices 104 (sometimes referred to herein as "client devices 104") can be implemented as any number of computing devices, including, without limitation, a personal computer, a laptop computer, a desktop computer, a portable digital assistant (PDA), a mobile phone, tablet computer, an electronic book (eBook) reader device, a set-top box, a game console, a smart television, a wearable device (e.g., a smart watch, electronic "smart" glasses, a fitness tracker, etc.), or any other electronic device that can transmit/receive data over a network(s) 112. The network(s) 112 is representative of many different types of networks and can include wired and/or wireless networks that enable communications between the various entities in the environment 100. In some configurations, the network(s) 112 can include cable networks, the Internet, local area networks (LANs), wide area networks (WAN), mobile telephone networks (MTNs), and other types of networks, possibly used in conjunction with one another, to facilitate communication between the server(s) 106 and the client devices 104. Although configurations are described in the context of a web-based system, other types of client/server-based communications and associated application logic also could be used.

The data center 108 can comprise a plurality of geographically-distributed server clusters, where a server cluster can comprise a subgrouping of the servers 106. In this manner, a vast number of customers 102 can access the online service(s) 110 from geographically disparate locations over the world. The various resources of the data center 108 can be structured in any suitable organizational framework so that the resources (e.g., tenants, individual server computers 106, etc.) can be tracked and managed. For example, tenants and servers 106 of the data center 108 can be organized into a plurality of forests 114(1), 114(2), . . . , 114(M) (collectively "forests 114"), wherein a forest 114 represents an active directory group for a group of tenants (or users 102) utilizing a subgroup of the servers 106. Tenants (or users 102) can be widely distributed in terms of geography. As an illustrative example, a set of first forests 114 can represent tenants and servers 106 in North America (i.e., a region), while a set of second forests 114 can represent other tenants and servers 106 in South America (i.e., another region), and so on. Regions can be defined at any level of granularity, such as continent, country, state, city, county, neighborhood, and so on. Within each forest 114 is a collection of sites 116, which represents lower level grouping of tenants and/or servers 106, and within each site 116 is a collection of database availability groups (DAGs) 118, and within each DAG 118 is a collection of the servers 116. For example, an individual DAG 118 can comprise approximately sixteen servers 116. By managing the data center 108 in such a hierarchical framework, the location of a problem that occurs with the online service(s) 110 can be more easily identified.

The environment 100 is further shown as including a first Internet service provider (ISP) 120(1) and a second ISP 120(2) (collectively "ISPs 120"). The ISPs 120 represent a plurality of ISPs 120 that can be involved in enabling access of users 102 to the online service(s) 110. That is, each ISP 120 can represent a third-party entity (or operator) that provides services to users for accessing, using, or participating in the Internet, and although two ISPs 120(1) and 120(2) are shown in FIG. 1, it is to be appreciated that any number of ISPs 120 can be involved in the network topology on which the online service(s) 110 is implemented.

In some configurations, the first user 102(1) (or a tenant including multiple users 102) can pay the ISP 120(1) for Internet access so that the user 102(1) (or tenant) can utilize the online service(s) 110. Furthermore, each ISP 120 can pay an upstream ISP 120 for Internet access such that multiple ISPs 120 can be interposed between the client device 104(1) and a destination server 106 in some scenarios. In some configurations, the interconnection between ISPs 120 can be relatively complex and can be cascaded multiple times until reaching a "tier 1 carrier," and/or an ISP 120 can have more than one point of presence (PoP) with separate connections to an upstream ISP 120, and so on.

Because the third-party ISPs 120 are not owned or controlled by the service provider of the online service(s) 110, the ISPs 120 are considered to be outside of the service provider's domain. The service provider 120 does not have the ability to locally monitor out-of-domain equipment, such as the networking equipment of the ISPs 120. However, the service provider of the online service(s) 110 can implement local active monitoring of its own data center 108, which is considered to be within the service provider's domain because the data center 108 may be owned and/or controlled by the service provider of the online service(s) 110.

FIG. 1 shows that the client devices 104 are configured to execute a client application 122 that is configured to access the online service(s) 110 over the network 112. For example, the client application 122 can comprise a co-authoring client application 122 that is built into, or downloaded after manufacture to, the client device 104 and configured to access a co-authoring online service 110 to allow the user 102(2) to work with other users via network 112 to co-author documents. Alternatively, the client application 112 can be a web browser that allows the client device 104 to access the online service(s) 110 in response to the user 102(2) entering a uniform resource locator (URL) in an address bar of the web browser.

In addition to connecting the client device 104 to the online service 110, the client application 122 can include a telemetry data module 124 that is configured to transmit telemetry data 126 to one or more servers 128(1), 128(2), . . . , 128(P) (collectively "server(s) 128") of an anomaly detection system 130. The anomaly detection system 130 can be owned and operated by the service provider of the online service 110, or by a third-party entity that the service provider contracts with to analyze the telemetry data 126 and to detect anomalies from the telemetry data 126 on behalf of the service provider of the online service 110.

In general, the telemetry data 126 comprises data that is generated as a result of the client application 122 accessing (connecting to or disconnecting from) the online service(s) 110 and as a result of the user 102 using the online service(s) 110 via the client application 122. The telemetry data module 124 can cause the telemetry data 126 to be stored locally in local memory of the client device 104 and/or transmitted to the server(s) 128 periodically and/or in response to events or rules. For example, the telemetry data module 124 can store, in local storage, and/or transmit the telemetry data 126 every few (e.g., 5, 10, 15, etc.) minutes, or at any suitable time interval, as the online service(s) 110 is being accessed by the client application 122 and used by the user 102. As another example, a rule maintained by the client application 122 can specify that telemetry data 126 is to be stored locally and/or transmitted in response to an event, such as an event comprising a successful connection to the online service(s) 110, or an event comprising the generation of a particular error code indicative of a connection failure, and so on. Accordingly, the anomaly detection system 130 can receive telemetry data 126 originating from a plurality of client devices 104 as the client devices 104 are used to access the online service(s) 110 from various geographic locations.

The telemetry data 126 that is transmitted periodically and/or in response to an event or rule can comprise various types of data and various amounts of data, depending on the implementation. For example, the telemetry data 126 transmitted from an individual client device 104 can include, without limitation:

a tenant identifier (e.g., a globally unique identifier (GUID) of the tenant),
a user identifier,
a machine identifier that identifies the client device 104 being used to connect to the online service(s),
a machine type (e.g., a phone, a laptop, etc.) along with information relating to the build, the make, the model, etc.,
an Internet Protocol (IP) address from where the client device 104 is connecting to the online service(s) 110,
logs of successful connections,
logs of failed requests,
logs of errors and error codes,
network type information (e.g., wired network connection, wireless network connection, connected to a proxy, etc.),
a server identifier of the last known server 106 to which the client device 104 was connected,
a server identifier of the server 106 to which the client device 104 is currently connected,
logs of user input commands received via a user interface of the client application 122,
service connectivity data (e.g., login events, auto discover events, etc.),
user feedback data (e.g., feedback about features of the online service(s) 110),
a client configuration,
logs of time periods the client device 122 took to respond to a user input event (longer time periods can be indicative of the client application 122 hanging or crashing),
logs of time periods for server responses to client requests,
logs of time periods for the following statuses: connected, disconnected, no network, needs password, get credentials, showing password prompt, showing certificate error, showing user interface, working offline, transient failures, version blocked presentation mode, trying to connect, failure lockout, or waiting, and so on.

It is to be noted that in various examples the telemetry data 126 does not include personal or private information other than a user identifier, and that the collection of any data that is regarded as personal or private in nature is not collected without first obtaining the explicit consent of the user 102.

The server(s) 128 of the anomaly detection system 130, which can be arranged in a cluster or as a server farm, and across multiple fleets of servers 128, are shown as being equipped with one or more processors 132 and one or more forms of computer-readable memory 134. The processor(s) 132 can be configured to execute instructions, applications, or programs stored in the memory 134. In some configurations, the processor(s) 132 can include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof.

The components included in the computer-readable memory 134 can include a telemetry data collector 136 configured to collect or otherwise receive telemetry data 126 from which anomalies relating to the online service(s) 110 are to be detected. The telemetry data collector 136 can be configured to receive the telemetry data 126 originating from a plurality of client devices 104 as the client devices 104 are used to access the online service(s) 110. The telemetry data 126 received by the telemetry data collector 136 can be maintained in one or more data stores of the anomaly detection system 130. Over time, a history of telemetry data 126 is obtained with time stamps corresponding to the time at which the telemetry data 126 was collected by, or transmitted from, the telemetry data module 124 of the client device 104.

In some configurations, the telemetry data 126 is classified into multiple classes of data so that a particular class of data can be pinpointed for detecting an anomaly with respect to the class of data. Furthermore, the classification of the telemetry data 126 can be hierarchically organized in that different class levels can be defined. For example, a high-level class of data can comprise "errors," and the class of data for "errors" can comprise multiple lower-level subclasses for each unique error code. Another high-level class can be defined for "tenants," and the class of data for "tenants" can comprise multiple lower-level subclasses for each unique tenant ID. Any similar class hierarchy can be defined, and any of the examples of telemetry data 126 described herein can be associated with an individual class and can be included in a higher-level class and/or include lower level subclasses within its own class.

Furthermore, the raw telemetry data 126 can be converted (or translated) into a set of metrics (e.g., a count or a rate). For example, instances of a particular error code in the telemetry data 126 can be counted in order to generate counts of the particular error code. A class of data for the particular error code can additionally, or alternatively, be analyzed over time to generate rates of the particular error code as another type of metric. Any similar metric can be generated from the raw telemetry data 126 for a given class.

The computer-readable memory 134 can further include an aggregation module 138 that is configured to aggregate classes of data according to a component of interest in the system in which the online service(s) 110 is implemented. There are many components of interest that can be defined for the system implementing the online service(s) 110. For example, a component of interest can comprise an ISP 120 (or a group of ISPs 120), a particular server 106 (or a group of servers 106) of the data center 108, a particular DAG 118 (or a group of DAGs 118) of the data center 108, a particular site 116 (or a group of sites 116) of the data center 108, a particular forest 114 (or a group of forests 114) of the data center 108, the entire data center 108, a particular tenant (or a group of tenants), a particular user 102 (or a group of users 102), a particular service 110 (or a group of services) if there are multiple online services 110 provided by the service provider, a client application 122, a client configuration, and so on.

As an illustrative example, the aggregation module 138 can be configured to aggregate a count (i.e., a metric) of a particular error code (i.e., a class of data) according to the first ISP 120(1) (i.e., a component of interest), the first ISP 120(1) being outside of the domain of the service provider because the service provider does not own or control the equipment of the first ISP 120(1). This allows the service provider to monitor the operational state of the first ISP 120(1) by analyzing the count of the particular error code with respect to the first ISP 120(1) to see if there is an anomaly in the data. In an example scenario where multiple client devices 104 are reporting telemetry data 126 with abnormally high instances of the particular error code and/or abnormally high time periods showing the particular error code (as compared to a predicted count of the particular error code and/or a predicted time period in which the particular error code is expected to be shown), an anomaly can be detected. This detected anomaly can be used to infer that a problem has occurred with the first ISP 120(1) that is outside of the service provider's domain.

Accordingly, the computer-readable memory 134 can further include an anomaly detector 140 that is configured to detect anomalies relating to the online service(s) 110 using the telemetry data 126. In order to detect anomalies, the anomaly detector 140 generates a prediction of what is to be expected under normal conditions for a given class of data at a selected aggregate. The prediction comprises a time series of values that vary over time and is based on historical telemetry data 126. Continuing with the above example, for a class of data comprising error code "A" at the aggregate of the first ISP 120(1), the anomaly detector 140 can generate a prediction of a metric relating to the class of data for the selected aggregate by analyzing a subset of the telemetry data 126 collected over time in the past. For example, telemetry data 126 collected over the past month (or any suitable time period) can be analyzed with respect to error code "A" at the aggregate of the first ISP 120(1) to generate the prediction curve. In some configurations, the anomaly detector 140 is configured to compute a Fast Fourier Transform (FFT) over a history of the telemetry data 126 to generate a prediction curve comprising a time series of expected values. The prediction, like the actual data, fluctuates over time to reflect increasing values of a metric during peak hours of the day and decreasing value of the metric during night hours when a majority of the users 102 are asleep and not interacting with the online service(s) 110.

The anomaly detector 140 is further configured to determine a prediction error by comparing the prediction to the values of the aggregated metrics received from the aggregation module 138. In some configurations, the prediction error comprises a difference between the actual value of the metric obtained from real-time telemetry data 126 and the expected value of the metric from the prediction. If the difference (i.e., prediction error) is greater than a threshold difference at a particular time, this condition can be considered an anomaly. In some configurations, an anomaly is detected when the threshold difference is exceeded by the prediction error over a predetermined period of time (e.g., 30 minutes). In this manner, anomaly is detected if an anomalous condition persists for a predetermined period of time. It is to be appreciated that because the prediction generated is not an absolute threshold (i.e., a single numerical value), normal fluctuations in the metric are not mistaken for an anomaly. Use of an absolute threshold for the prediction is insufficient in this regard, as it would either detect anomalies where there is nothing wrong with the online service(s) 110 (i.e., generate too much noise), or not detect anomalies that should have been detected. Thus, the prediction generated by the anomaly detector 140 is more accurate than an absolute threshold prediction.

The class of data gives the anomaly detection system 130 information as to what the problem is (e.g., a problem relating to a particular error code), while the aggregate at which the anomaly is detected gives the anomaly detection system 130 information as to where the problem has occurred in terms of a component or node of the system that is used to implement the online service(s) 110. When an anomaly is detected, an alert can be generated and provisioned by the anomaly detection system 130 so that the service provider of the online service(s) 110 can take remedial action. For example, if an anomaly indicates a problem with the first ISP 120(1), an alert can be transmitted to personnel of the service provider that informs the personnel of the problem (based on the class of data) and provides information that allows the personnel to contact the ISP 120(1). In some configurations, automated recovery can be initiated in response to a detected anomaly. The eligibility of automated recovery can be conditioned on the type of anomaly detected. For example, automated recovery can be conditioned upon anomalies that are detected for components of the system within the service provider's domain, such as an anomaly that indicates there is a problem with a particular server 106 of the data center 108 operated by the service provider. In an example, an anomaly may have been detected as a result of a server 106 in the data center 108 having not been provisioned a software code patch that allows the server 106 to function properly. In this case, the fact that the server 106 is within the service provider's domain allows for automated recover to be initiated so that the updated patch is pushed to the non-functional server 106.

Further details regarding the telemetry system of FIG. 1 may be found in U.S. Pat. No. 9,979,675, the contents of which were incorporated by reference above. Generally speaking, the telemetry system described in U.S. Pat. No. 9,979,675 collects and converts classes of telemetry data into a set of metrics and aggregates the set of metrics according to a component of interest to obtain valued of aggregated metrics over time for the component of interest. An anomaly is identified based on a prediction error generated by comparing the values of the aggregated metrics to a prediction. However, the system described in U.S. Pat. No. 9,979,675 aggregates metrics by component and does not use aggregated metrics to measure the overall quality of online service experiences from the user's perspective. While U.S. Pat. No. 9,979,675 would enable dashboards to monitor telemetry signals separately and then aggregate them, there is no mechanism for providing a common metric across components and areas at a session level where the user experience may be monitored as opposed to the status of a system component.

Rather, as illustrated in FIG. 2, the telemetry data 200 is sorted by team 202 and product scenario 204. The telemetry data report is referenced at 206, and a description of the anomaly is described at 208. Links to the telemetry data are provided at 210. As indicated, there are very few end to end user experience metrics and every metric is per operation. There is no common baseline and no way to correlate the collected data to or summarize the customer experience. Thus, it is difficult to assess the impact of failure of one or more components used to provide an online service on the customer experience.

The system described below with respect to FIGS. 3-14 expands upon the system described with respect to FIG. 1 to include a veto-based model based on user "candidate sessions." In order to understand the veto-based model, a few concepts are defined for purposes of this description.

Once the required telemetry signals are collected in sample embodiments, they are combined in a way that permits a meaningful classification of good/bad customer experiences with the online software product. To do this, a common context is needed under which a customer experience assessment may be conducted. It is first recognized that the content and nature of users of an online product vastly influences the user's experience. Accordingly, aggregating the telemetry data into "application level" metrics is random and is not meaningful. Similarly, users of an online co-authoring application, by way of example, may interact with different sets of people on the same document at different times. Such users tend to leave documents open for days together which means that a user can transition from solo editing to co-authoring and back multiple times. Also, the same document can be reopened and closed multiple times and the user can have different experiences with the same document based on how the server reacts. Accordingly, aggregating these telemetry signals into "document level" metrics may be meaningless.

Instead, a new context called "Session ID" is defined which is tied to a user's participation in an instance of an online service. The Session ID is an identifier for an application process from boot to termination. For the sake of explanation, it will be assumed that the online session is an online co-authoring session in a sample embodiment. In a co-authoring session, a user can open multiple documents and can co-author one or more of the multiple documents.

It will be appreciated that in the case of an online co-authoring application that it is difficult to measure the various tenets of a good online co-authoring experience (fast propagation of changes, no merge conflicts, ability to see other people, etc.) from the many telemetry signals that may be obtained from the various online components of a co-authoring system. This difficulty is primarily due to:

no way to combine telemetry for the same scenario across the different components/layers;

reliability signals of components like save, upload, etc. cannot be broken down between co-authors versus solo editing;

many of the telemetry signals do not directly reflect user experience unless combined with other signals (e.g., co-author channel set-up, end-to-end change latency, etc.); and merely looking at an individual component's health in isolation and improving its health does not necessarily provide the desired increase in perceived service quality.

As an example, consider the following components of an online co-authoring service:

Component A—The server is busy and decides to throttle certain "non-critical" requests. This is acceptable to a user under the user's service level agreement.

Component B—The synchronization component of a co-authoring service is downloading a table of co-authors and hits a download failure ServerBusy, but the error is retriable and the component will attempt to retry this download in a while. The table of co-authors is not considered by this component to be "critical" as it is only metadata. The individual component's telemetry would measure this scenario as acceptable, assuming the retry succeeds.

Component C—the user experience component higher up in the stack that displays the current co-authors now has outdated data. The user, who wants to pull up his list of co-authors and chat with them, is unable to find his co-author and is confused as to whether that co-author is currently sending changes. Component C reports this scenario as fine as well. The component simply did not have the co-author data.

When viewed in isolation, each of these components was doing what it was supposed to and would report that it was within its acceptable service level agreements. However, when the components are considered collectively, the user might experience a "time to detect editor presence" that was unacceptable, resulting in user feedback in the form of perceived "host download failure" when using the online co-authoring service.

In sample embodiments, it is recognized that a Session ID is the most widely available ID to unify the telemetry, which is important because important activities like joining co-authors for every instance of co-authoring are performed and these activities may have a huge impact on the quality of the co-authoring user experience. The system file input/output (I/O) will create and populate this Session ID as a global context for all teams to log with their co-authoring related activities. When this happens, the presence of this Session ID across all these activities will enable the combination of these activities. It is noted that existing IDs like Office Collaboration Service (OCS) Session ID (a merge service) or Real-Time Channel (RTC) Session ID (a sockets-based replication service) cannot be used as a user is never guaranteed to connect to these services and it often takes non-trivial time to do so. In some cases, the system may voluntarily transition back from the OCS for unsupported content, etc. This makes it difficult to rely on such IDs for correlating all telemetry signals. An ID tied to explicit events that mark the start and end of the online session is thus preferred.

With the common schema used in the telemetry system of FIG. 1, "candidate sessions" may be defined using a common Session ID that is uniquely assigned to each process as it starts up and deallocated as it terminates. As used herein, this is a GUID titled "Session_Id." For example, an example Session_Id may be written as: 123e4567-e89b-12d3-a456-426655440000. Through all the events that occur during a user's process session, the Session_Id field remains a constant value. By identifying a starting point such as a file open event (most relevant as file I/O) and then identifying other events from a session, a complete session may be flattened into a single tuple with varying characteristics. For example, if the Session_Id above emitted the following three events:

| Session_Id | Event_Time | Event_Name | CommonSchema1 . . . 10 |
|---|---|---|---|
| 123e4567 . . . | Oct. 16, 2018 7:00 pm | File_Open_Event | |
| 123e4567 . . . | Oct. 16, 2018 8:30 p | File_Save_Event | |
| 123e4567 . . . | Oct. 17, 2018 9:00 am | BeganCoauthoring_Event | | a (SQL like) query could be run from the datastore as follows:

```
Function GetCandidateSessions( )
{
    let AllLoadFiles = File_Open_Event;
    let AllCoauthTransitions = BeganCoauthoring_Event | extend
    IsActiveCoauthSession= true;
    AllCoauthTransitions
    | union AllLoadFiles
    | distinct bin(Event_Time, 1d), App_Name, App_Platform,
    IsActiveCoauthSession, Session_Id
    | summarize IsActiveCoauthSession = max(IsActiveCoauthSession),
    Event_Time = min(Event_Time), by App_Name, App_Platform,
    Session_Id
}
``` to get a tuple like the following:

| IsActiveCoauthSession | Event_Time | App_Name | App_Platform | Session_Id |
|---|---|---|---|---|
| TRUE | Oct. 16, 2018 12:00 am | PowerPoint | Win32 | 12334567 . . . |

Note here that multiple session events have been flattened to receive one single tuple with aggregated characteristics. In this example, since the user eventually began coauthoring on 10/17/18, this session is classified as "IsActiveCoauthSession=TRUE". The session time has also been assigned to the first available session time available since the sessions often span multiple days. In use, the query above would add in several more characteristics, and would return several hundreds of thousands of such flattened tuples that are deemed to be "Candidates". The candidate definition is extensible and grows to add new characteristics as and when business/analysis needs grow.

In addition, as used herein, a "veto" is a unit of failure that has resulted in some form of negative user experience with an online product. A user facing failure or failure to meet certain criteria with the online product makes the session bad. A single veto would classify the entire session as unsuccessful, but multiple vetoes can fail a session. A session also can be affected by multiple sessions. Each veto tracks a specific aspect of the user experience. Vetoes can be calculated from the same event data mentioned above or the vetoes can come from any disparate source as long as they are identifiable by the same common field—the "Session_Id". As used herein, vetoes are independent and normalized views of online product health signals. As will be explained further below, each veto may be visualized on a drill-down dashboard with an identification of the ownership of the source of the problem and a collection of related information.

The veto-based model described herein computes the actual veto in a manner that is completely detached from the system of computing overall system health. Vetoes can be gathered from events emitted from anywhere in the product as described above with respect to FIG. 1 and from any owners and of any type of user experience. The calculated output of any veto is simply a column of the corresponding "Session_Ids" which is used to process a final table representative of the health of the online product.

Since the only requirement of a veto is an output column of Session_Ids, veto calculations can be as simple or as complex as veto owners desire. For example, as simple reliability veto definition may simply require that an event be unsuccessful, as follows:

```
function_Veto FileIO_Save(startDate:datetime, endDate:datetime) {
    File_Save_Event
    | where Event_Time > startDate and Event_Time < endDate and
    Activity_Success == false
    | distinct Session_Id;
}
```

-continued

```
Output:
   Session_Id
      123e4567...
      abcd1234...
      etc...
```

Other, more complex reliability veto definitions (where the output format is exactly the same) may determine that a session is unsuccessful based upon the lack of success of a combination of events as follows:

```
Veto_FileIO_DataLoss(startDate:datetime, endDate:datetime,
isServerIssue:bool, requestType:string) {
    let partialSyncRetryOnceFilter =
        (
            T:(
                Activity_Result_Code:long,
                Activity_Result_Tag:long,
                Data_FullIError:string)
        )
        {
            T
            | where Activity_Result_Code == -1057356305
            | where (Activity_Result_Tag == 21106907) // tag_bq7d1
                or(Activity_Result_Tag == 21106771 and Data_FullIError== "1519
[bq7bt]!614")
        };
    Office_FileIO_CSI_RequestCompletionHandlerOnComplete
    | where Data_RequestType =~ requestType
        and Data_Partition == 0
    | invoke partialSyncRetryOnceFilter( )
    | union
    (
        Office_FileIO_CSI_ContentPartitionQueryChangesCompleted
        | where requestType =~ "Download"
        | invoke partialSyncRetryOnceFilter( )
    )
    | union
    (
        commonFilter(Office_FileIO_CSI_ContentPartitionPutChangesCompleted)
        | where requestType =~ "Upload"
        | invoke partialSyncRetryOnceFilter( )
    )
    | extend Activity_Success = false
    | distinct Session_Id
}
```

Performance of an online product is typically measured with aggregated percentiles across a population rather than with averages or absolute values. For example, a search engine might set a query latency goal of one second at the 95$^{th}$ percentile. To achieve this goal, at least 95% of queries would have to complete in one second or less. Percentiles allow for a certain buffer for extreme outliers in behavior. However, because the percentiles are based on aggregation, they do not lend themselves to an obvious expression as vetoes.

An approach to translating percentiles to vetoes involves a two-pass approach. A set of session data is selected with observed values M, such as the latency of each operation. The veto can be defined with a maximum target metric value T at a specific percentile P. The first pass computes the actual metric value A of the session data at percentile P. The second pass examines each observed value M in the session data and produces a veto signal if T<M<A.

At first this approach may seem counter-intuitive because some observed values M will cause a veto, while other values, which are objectively worse, will not. This happens when observed values are "worse" than the value observed at the target percentile A. This reflects the goal of the percentile calculation itself, which is to discard extreme values.

It is also noted that if A>T then no vetoes will be generated. This reflects the ideal case where the observed data falls completely within the desired goal as reflected in the following example:

```
Veto_RTC_SetupLatency(startDate:datetime, endDate:datetime) {
    let SampleData = Office_FileIO_RTC_RealtimeChannelSetup
    | where Event_ReceivedTime > startDate and Event_Time >
    startDate and Event_Time < endDate
    | where Activity_Success == true
```

-continued

```
    | where Data_SequenceNumber == 0
    | where Data_Count_FindSession <= 1
    | where Data_Count_OpenConnection <= 1
    | where Activity_Duration < 300000000
    | project Session_Id, Activity_Duration, Day = bin(Event_Time,
    1d); SampleData
    | summarize P95 = percentile(Activity_Duration, 95) by Day
    | join
         SampleData
    on Day
    | where Activity_Duration > 5000000 and Activity_Duration < P95
    | distinct Session_Id
}
```

Figure 3:
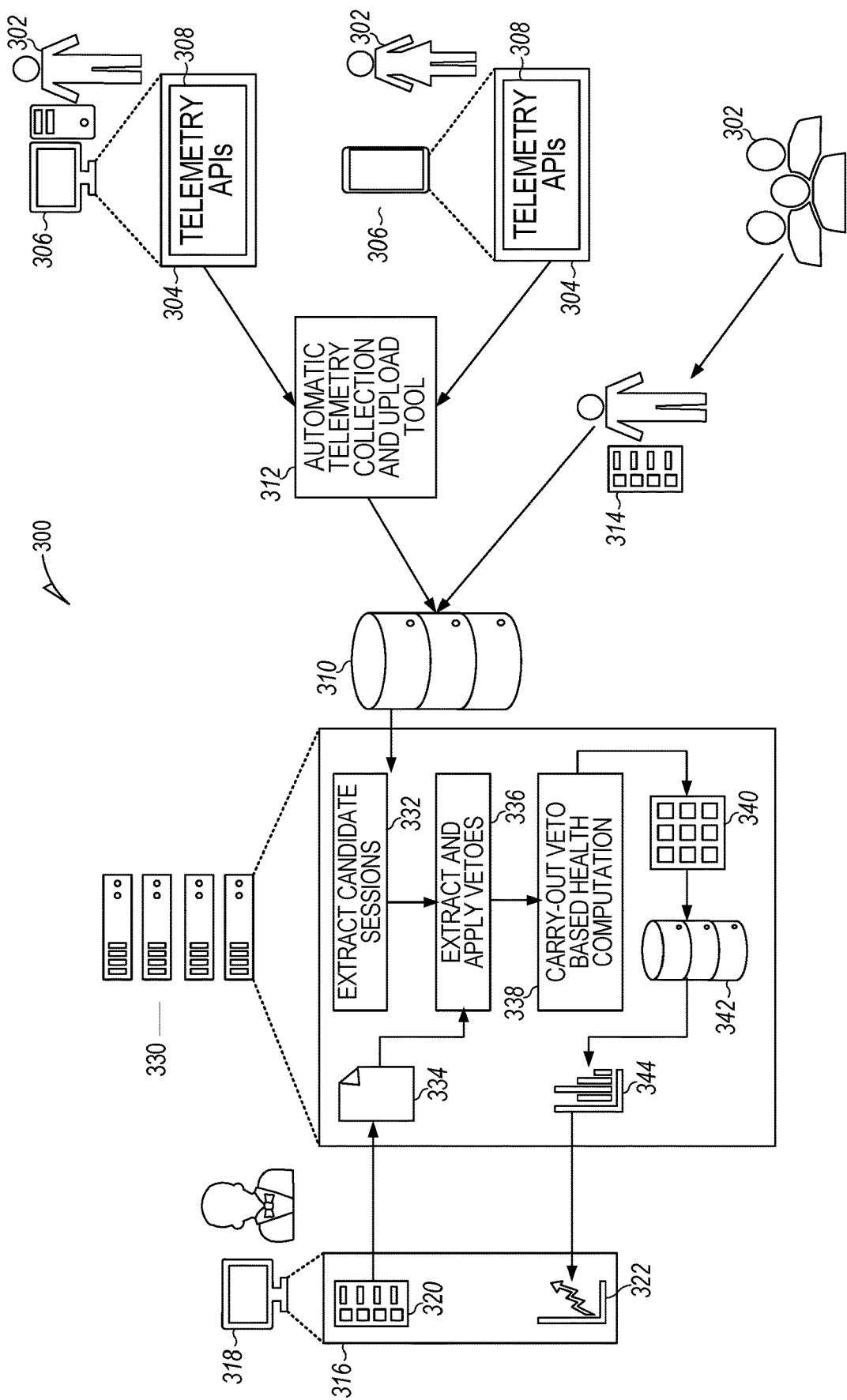
FIG. 3 is a system diagram of a veto-based system for measuring health of a cloud-based software product in a sample embodiment.

Based on these definitions, FIG. 3 illustrates a veto-based system 300 for measuring the health of a cloud-based software product in a sample embodiment. As illustrated, users 302 interact with an online software application 304, such as a co-authoring platform, via their computing devices 306. In sample embodiments, the software applications 304 are equipped with automatic telemetry APIs 308 for automatic telemetry collection using techniques such as those described above with respect to FIG. 1. The telemetry data including usage, reliability, and performance feedback data so collected is uploaded to a telemetry data store 310 using automatic telemetry collection and upload tool 312. The telemetry data reflects the reality of the user experience with the online software application 304 as it captures the impact of service unavailability and gaps in service telemetry or design. The telemetry data also can capture the experience impact from user side mitigations like retries. As illustrated, users may also manually collect and upload data to the telemetry data store as indicated at 314.

On the other hand, the product developers or service-side users of the online software application 304 interested in the performance of the online software application 304 may be provided with an application interface 316 accessible via the user's computing device 318 as illustrated. The application interface 316 provides the user with a visual interface 320 through which bad user experiences (subject to a veto) may be defined as veto definitions. The veto definitions provide a guide to the system as to what telemetry data is needed. Also, a dashboard view 322 of the product health may also be presented to the user via the application interface 316.

The product health is determined using the veto model computation system 330 in a sample embodiment. As illustrated, veto model computation system 330 identifies and extracts candidate sessions at 332 and applies the veto definitions 334 defined by the user via visual interface 320 by extracting and applying the vetoes from the candidate sessions at 336. The health of the online software application 304 is then calculated at 338 as a function of the collected vetoes. For example, any single veto applied to a session may veto the entire session. As noted above, the veto may be based on a single event or a combination of events. A combination of candidate sessions invalidated by vetoes may exhibit a pattern that enables the service operator to gain a more holistic view into the product health and the source of any problems. It will be appreciated that since the vetoes may be automatically collected as a result of meeting the veto definitions and may also be provided manually by the user that the collected vetoes better represent user experience metrics with the online software application 304.

Once the health of the online software application 304 is calculated at 338, a final veto-based health table 340 for the online software application 304 is generated and stored in a data store 342, which is updated periodically. The veto-based health table 340 may then be accessed by visualization software 344 to generate dashboard views representative (see e.g., FIGS. 9-11) of the health and user experiences of the online software application 304 for presentation to the user as dashboard view 322.

It will be appreciated by those skilled in the art that the telemetry data store 310, the user application interface 316, and the veto model computation system 330 may be deployed on a single computing device or on separate machines as illustrated in FIG. 1 to deliver the functionality as a cloud service.

Figure 4:
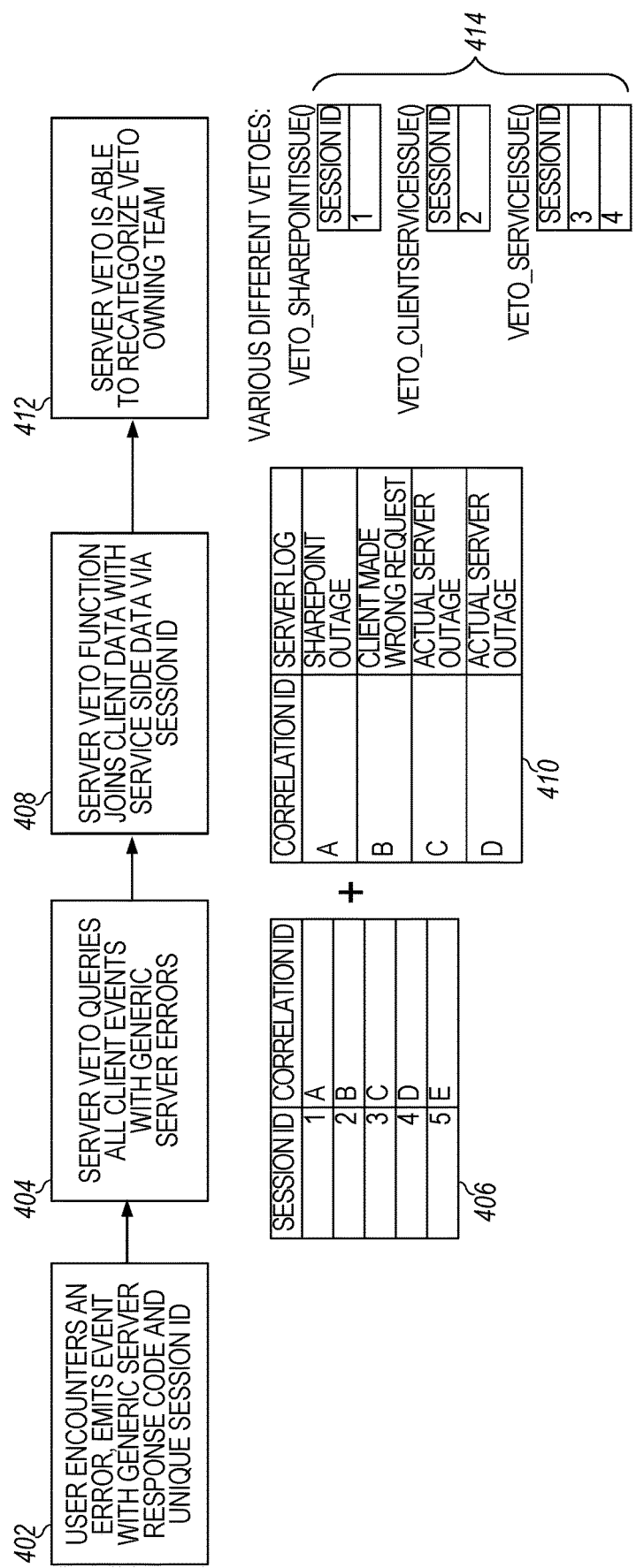
FIG. 4 illustrates a client-service veto model example of the veto-based system of FIG. 3.

FIG. 4 illustrates a client-service veto model example of the veto-based system of FIG. 3. As illustrated in FIG. 4, at 402 the user encounters an error in the online software application 304 and the telemetry APIs 308 emit a telemetry event having a generic server response code and unique Session_Id for correlation. At 404, the veto model computation system 330 queries all client events with generic server errors across different Session_Ids/correlation Ids 406. The veto model computation system 330 then functionally joins the client event data with corresponding service side data from the server log using the Session_Id/correlation Id at 408 to generate data table 410. Then, at 412, the veto model computation system 330 recategorizes the vetoes to the team that "owns" the service side data for the various service issues 414 outside of the predefined performance metrics and the respective Session_Ids.

With this method, instead of all four vetoes being attributed to the service team (who must then perform an initial investigation), the user vetoes are automatically augmented with service knowledge and correct attributions are made. It will be appreciated that such techniques may be used for any of a number of defined veto examples, such as:

Vetoes based on whether a user interface element was shown or not
Vetoes owned by other teams entirely
Vetoes based on product crashes
Vetoes based on whether a user elected to send negative feedback.

Figure 5:
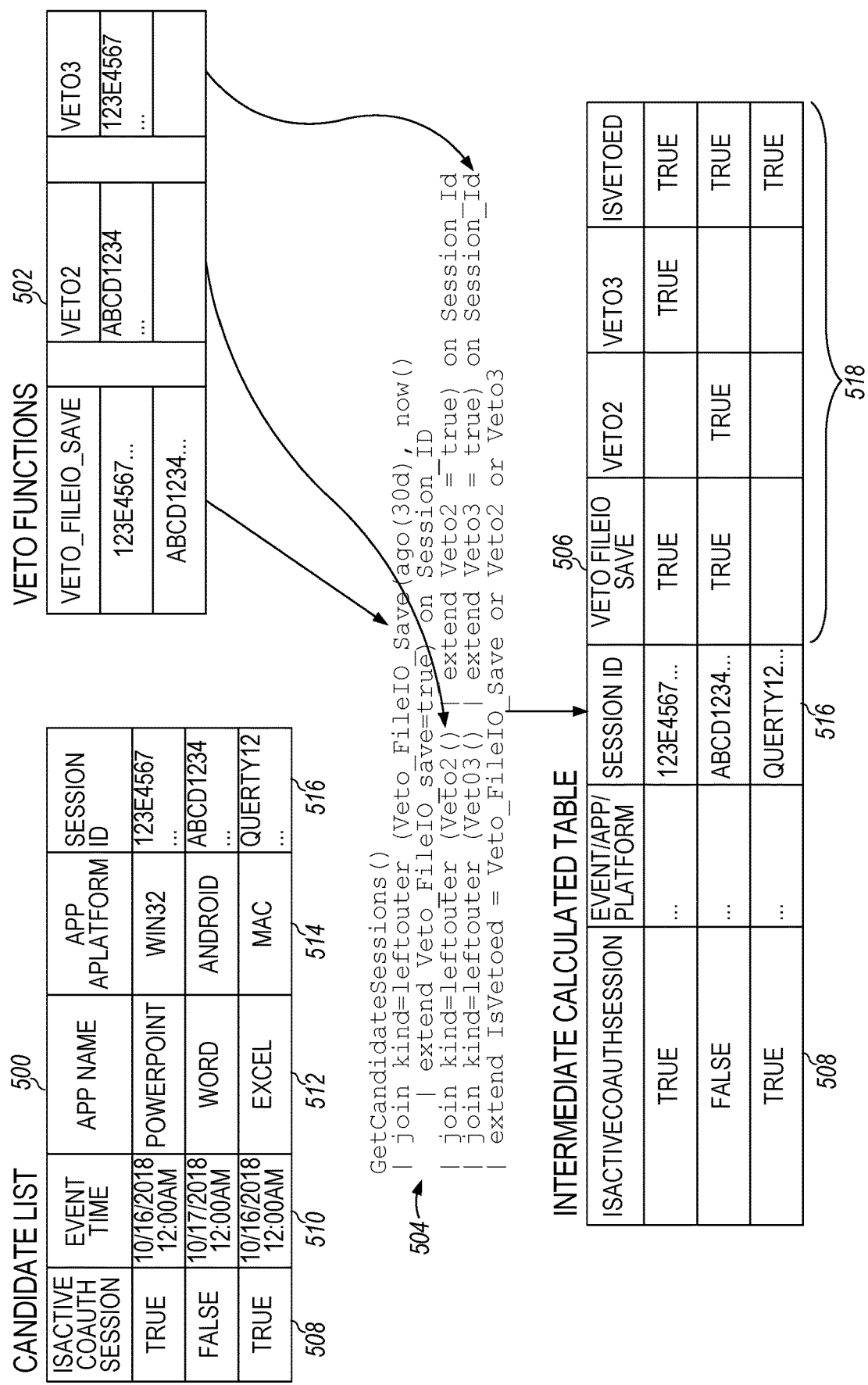
FIG. 5 illustrates the final veto calculation as a series of joins between candidate data and columns resulting from the various veto functions.

The final veto calculation is a series of joins between the candidate data and the columns resulting from the various veto functions. FIG. 5 illustrates the final veto calculation where the candidate list 500 is joined with the veto functions 502 as illustrated in the code snippet 504 to generate the intermediate calculated table 506. As illustrated, the candidate list 500 includes an indication as to whether the online session is actively coauthored on at 508, the time of the event 510, the name 512 of the online software application 304, the application platform 514, and the Session_Id 516. The intermediate table 506 is then aggregated on the basis of the unique Session_Ids 516 to provide numbers and data collections correlated with the vetoes 518 that can be visualized as shown in FIG. 6, which illustrates an intermediate table 600 that is aggregated on the basis of the unique session_IDs to provide values that may be visualized for the candidate sessions using the code snippet 602.

FIG. 7 illustrates a sample final calculated table 700 derived from the aggregated telemetry data and veto data of FIG. 6. The final calculated table 700 may be stored as final health table 340 in data store 342 as described above with respect to FIG. 3. As illustrated in table 700, the vetoes are identified at 702 and correlated to the event time 704 for the application 706 and application platform 708. The final calculated table 700 may further indicate whether the online product is in an active coauthoring session at 710 as well as the number of distinct sessions at 712. The sum of the vetoes may be stored at 714 as indicated.

Figure 8:
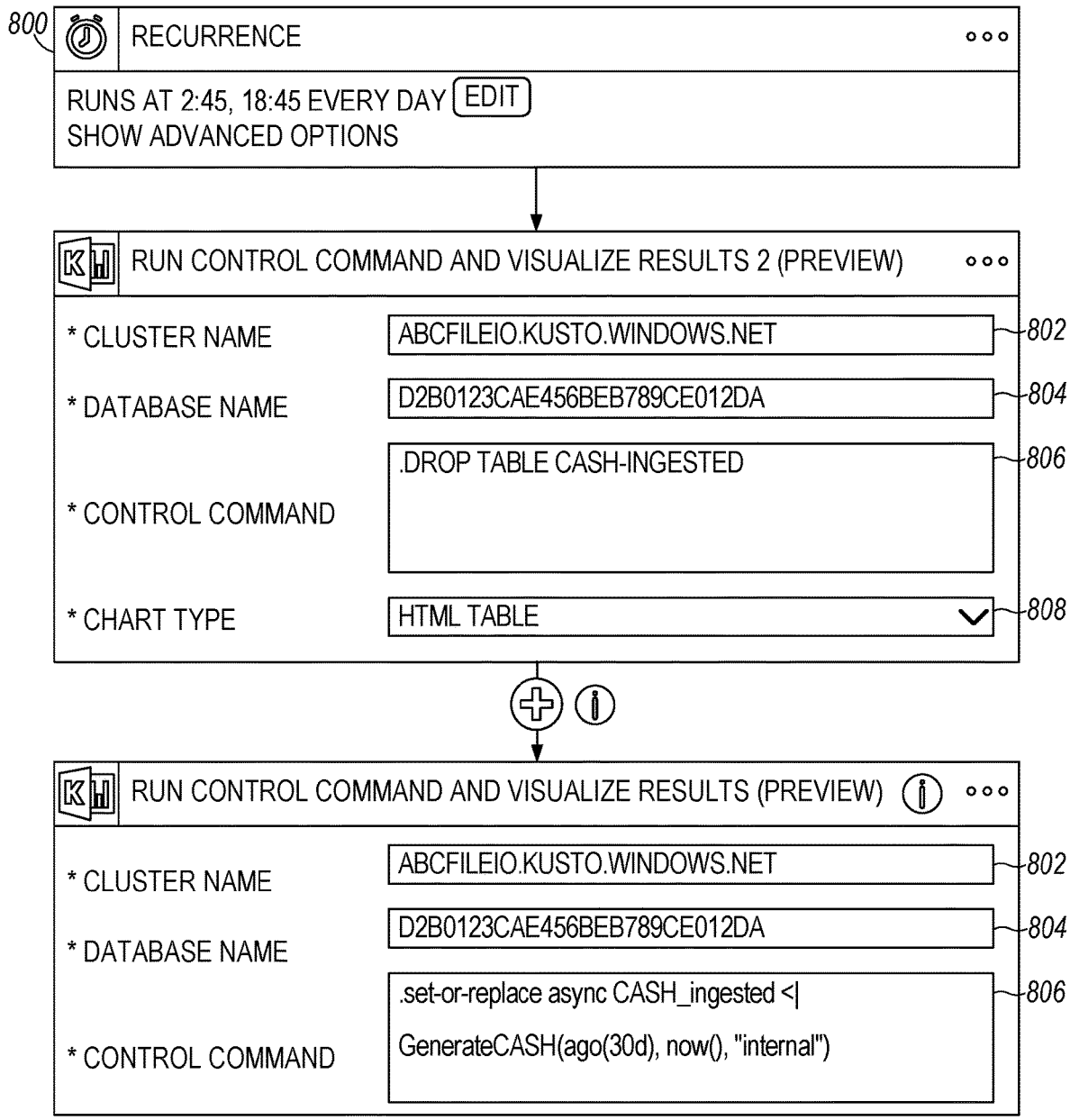
FIG. 8 illustrates a scheduling mechanism for operating on the stored tables to generate visualized results.

FIG. 8 illustrates a scheduling mechanism for operating on the stored final calculated tables 700 to generate visualized results. These final calculated tables 700 are recalculated and stored back into the datastores 342 (FIG. 3) via regularly scheduled jobs. In a sample embodiment, the scheduling mechanism is Microsoft® Flow™, which allows the datastores 342 to be operated on with a recurrence 800 to generate visualization results for respective data clusters 802, databases 804, and control commands 806. The format of the data visualization may also be selected at 808.

Figure 9A:
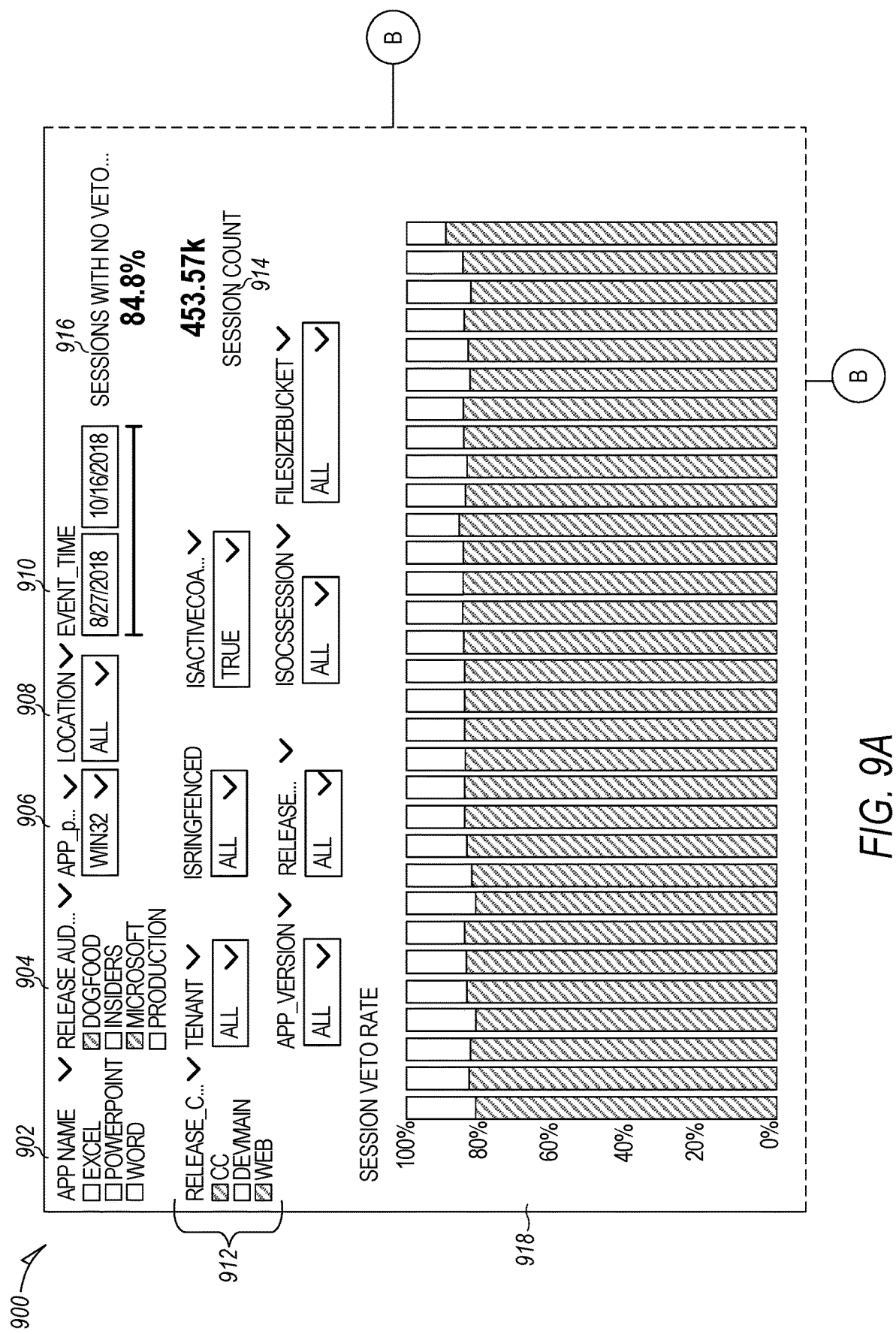
FIGS. 9A and 9B together illustrate a sample data visualization of the final calculated table illustrated in FIG. 7.
Figure 9B:
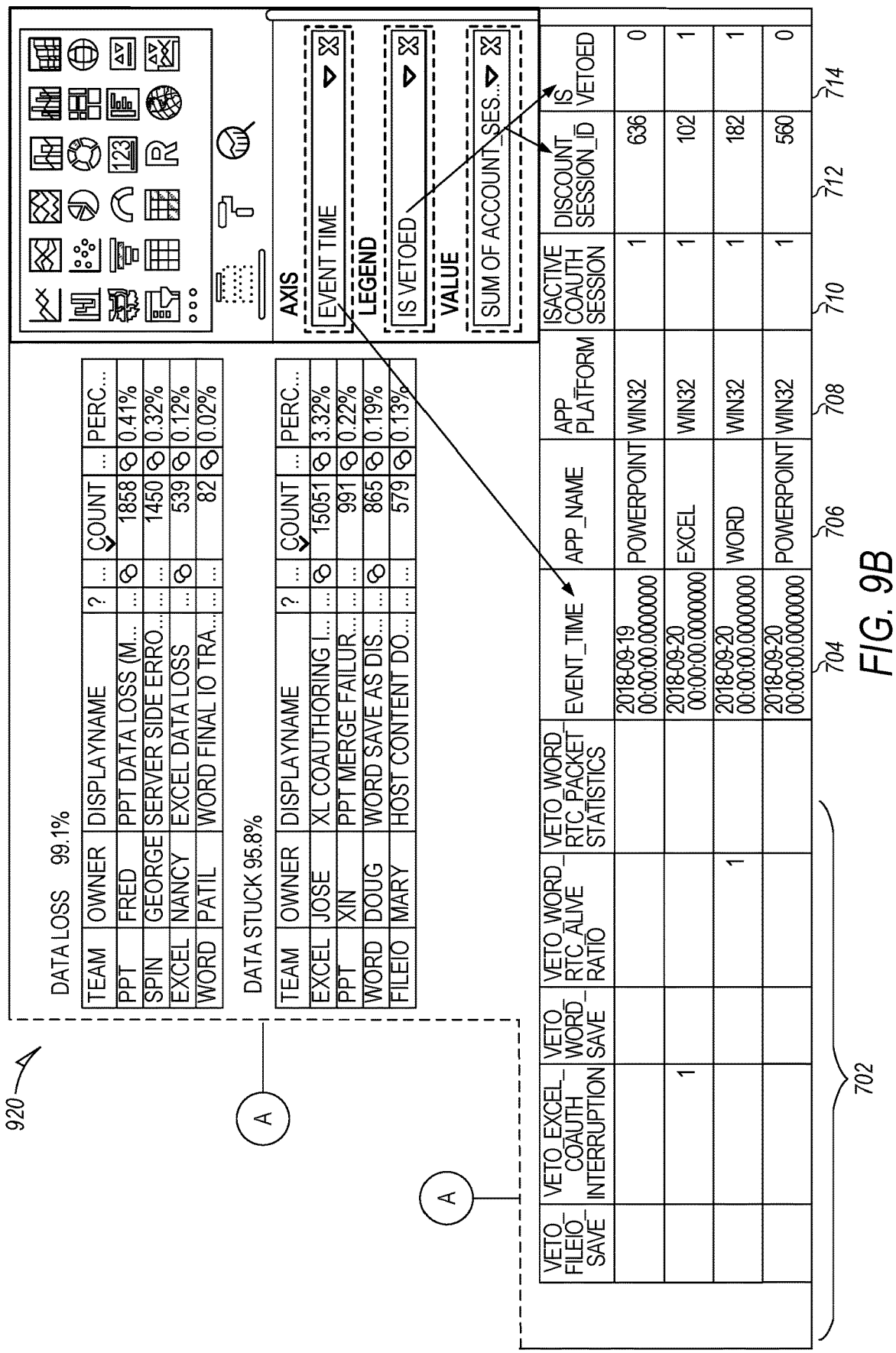
Figure 10:
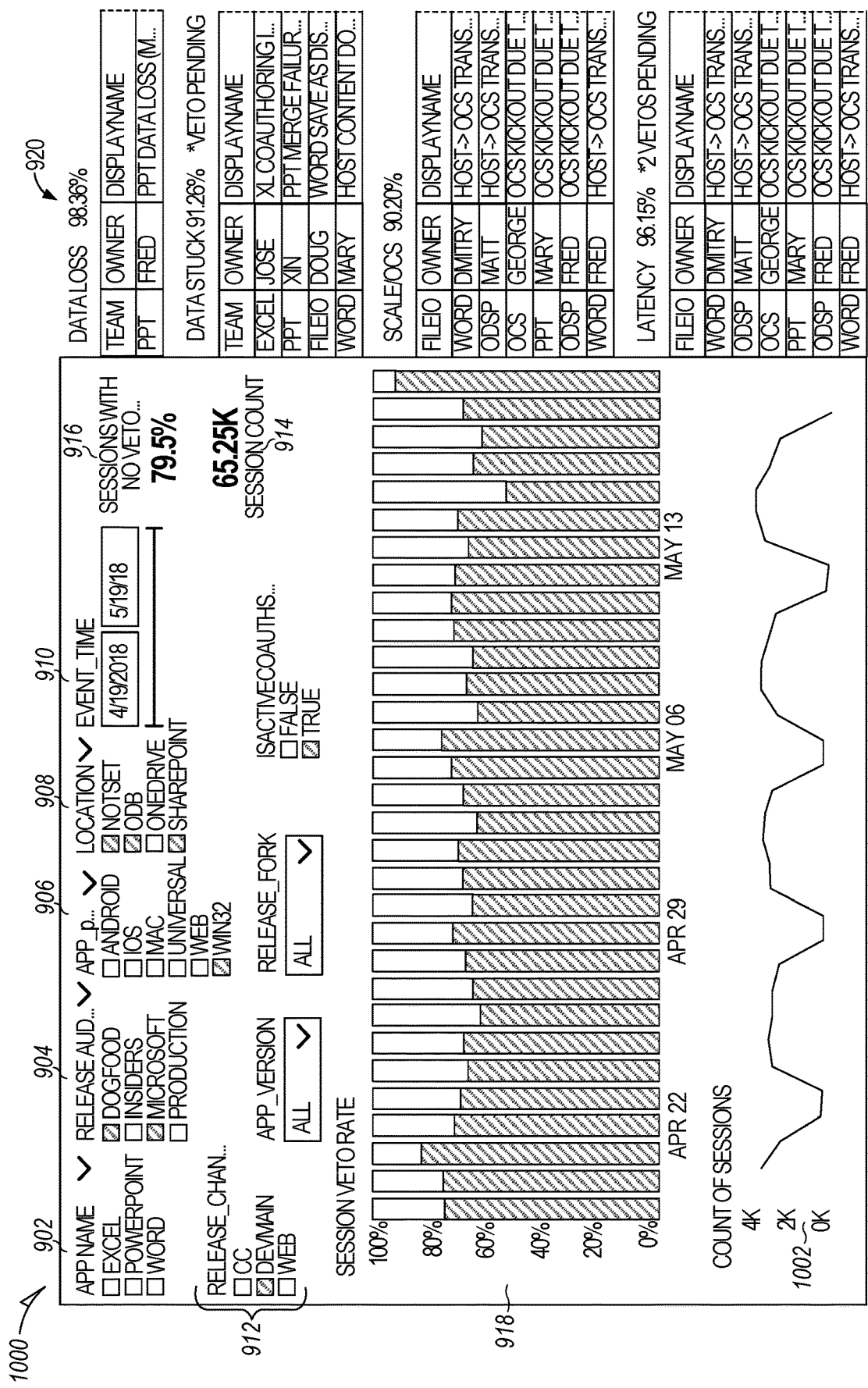
FIG. 10 illustrates a sample data visualization showing the filtering controls available to the user as well as a listing of the issues that led to vetoing of the sessions.
Figure 11:
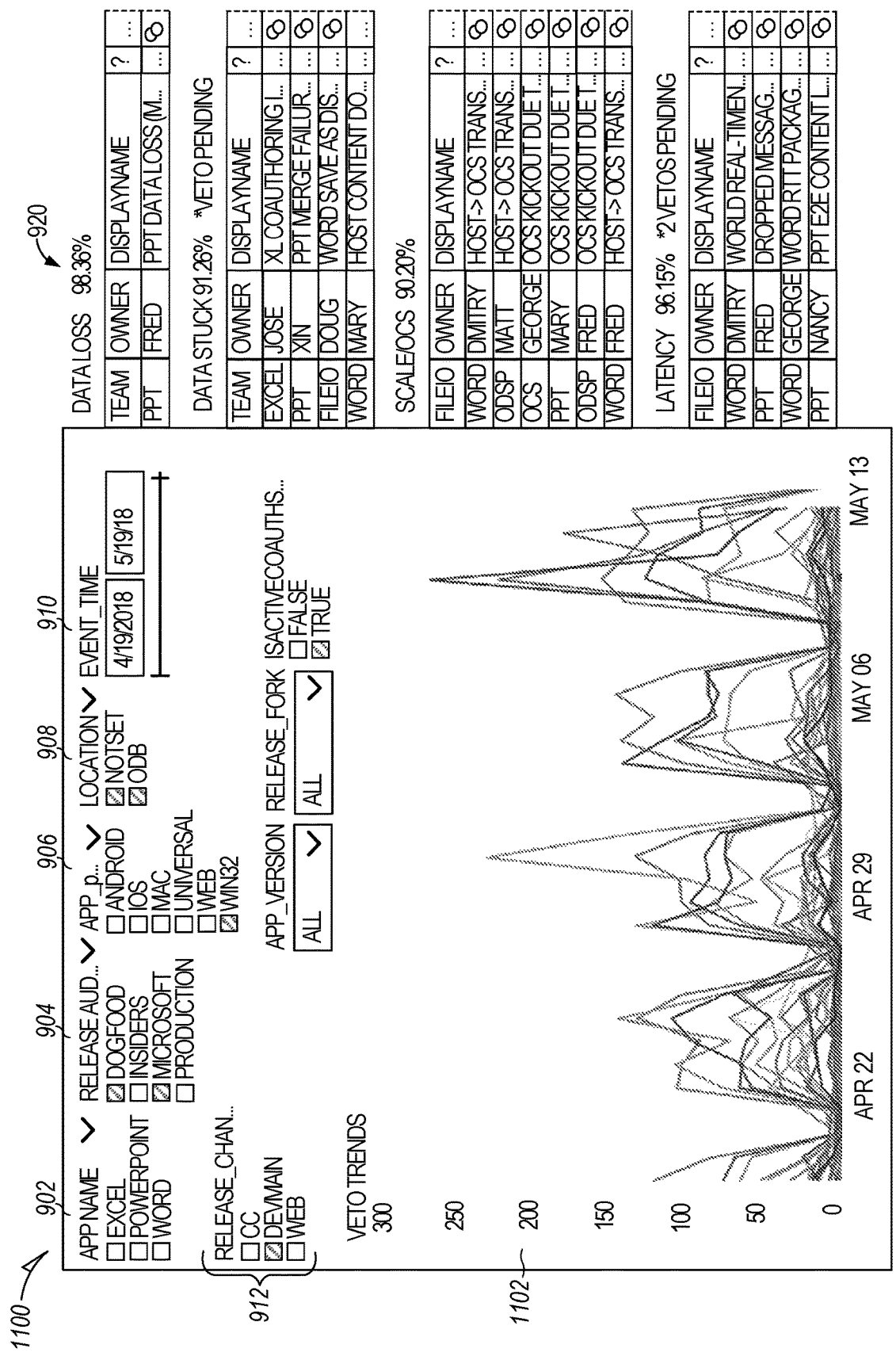
FIG. 11 illustrates a sample data visualization showing the veto trends for the vetoed sessions represented in FIG. 10.

FIG. 9A, FIG. 9B, FIG. 10, and FIG. 11 illustrate sample data visualizations generated from the final calculated tables using PowerBI® visualization software available from Microsoft®. As illustrated in FIGS. 9A and 9B, the final calculated table 700 illustrated in FIG. 7 plugs almost directly into the data visualization 900. As also illustrated, the service side user may also select via user interface 316 the application name 902, release audience 904 for the online software application 304, application platform 906, location 908, event timeframe 910, and other specialized filters 912 to filter the telemetry data as desired. The session count 914 and sessions with no veto may be displayed numerically at 916 and/or in chart form over time at 918. The vetoed session may also be displayed at 920 as desired. As shown in FIG. 10, the data visualization 1000 may include chart 918 which organizes the session veto rate by date (event time) in conjunction with the session count 1002. Also, as shown in FIG. 11, the data visualization 1100 may include chart 1102 illustrating veto trends over time. Such data visualizations also may indicate application usage by product sessions, the percentage of sessions in different modes (e.g., OCS, host+channel, or just host), and sessions by number of participants per session.

FIG. 12 illustrates a final table 1200 including the metadata identifying the product 706, the product platform 708, and the vetoed attribute 1202 and veto column 1204. All the columns in table 1200 are based on additional metadata that the final table 700 contains except that the veto columns 1202 and 1204 are unpivoted.

Figure 13:
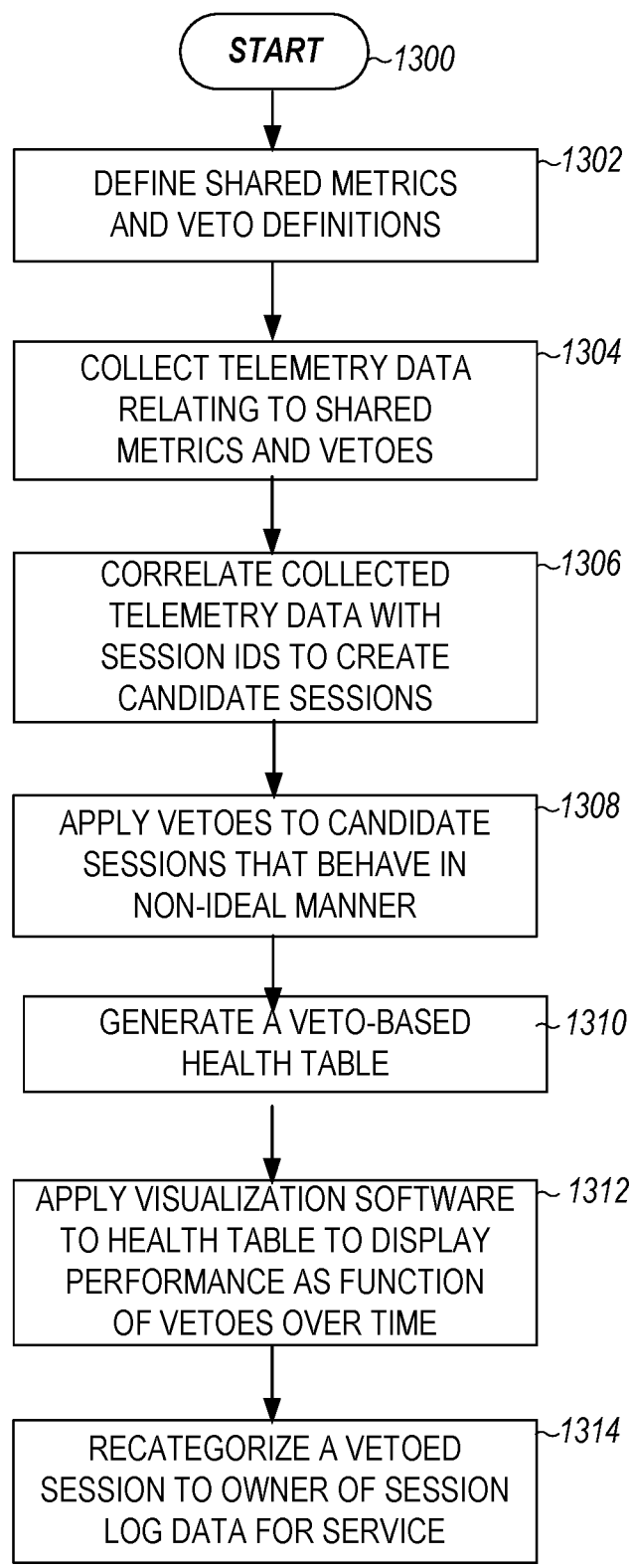
FIG. 13 is a flow diagram illustrating a sample embodiment of a method of determining the performance of a cloud-based software platform over time.

FIG. 13 is a flow diagram illustrating a sample embodiment of a method of determining the performance of a cloud-based software platform over time. The process starts at 1300 by defining shared metrics and veto definitions at 1302 (e.g., the bad outcomes are defined by the user through user interface 320). Defining shared metrics includes defining what constitutes a good experience with the software product, inventorying telemetry data needed for measuring performance of the software product and providing a basis for combining the telemetry data into shared metrics. As noted above, the unit of failure is defined by the user as a function of one or more vetoes and represents top Quality of Experience issues impacting the shared metrics. Creating a shared metric begins with a candidate list of sessions of the software product potentially performing outside of the predefined performance metrics. As noted above, the candidate list of sessions contains a session identifier, metadata about the sessions, and why each session was chosen as part of a candidate list of sessions.

The telemetry data so defined is collected at 1304 (e.g., in telemetry data store 310 in FIG. 3) to determine whether different features of sessions of the software product are operating properly (i.e., have not been vetoed). The telemetry data represents the shared metrics across different participants and components participating in a session and vetoes applied to the sessions. The collected telemetry data is correlated with session identifiers in tables (e.g., see FIG. 4) at 1306 identifying the session from which the telemetry data was collected. Candidate sessions that have been vetoed are identified and extracted and the unit of failure definition is applied to the candidate sessions.

Vetoes are applied to the candidate session list at 1308 (e.g., at 336 in FIG. 3). The vetoes are signals provided by components and/or owners of the software that identify a problem and include session identifiers when the components and/or service area behave outside of predefined performance metrics. A number of candidate sessions potentially invalidated with a multitude of vetoes may be combined to generate the unit of failure (e.g., at 338 in FIG. 3). For example, as noted above, the unit of failure may be a single veto or a combination of events/vetoes for one or more candidate sessions. Also, in the case of using aggregated percentiles to determine whether the software product is operating outside of the predefined performance metrics, the percentiles may be translated to vetoes by selecting a set of session data with observed values M, defining a veto with a maximum target metric value T at a specific percentile P, computing an actual metric value A of the session data at percentile P, and producing a veto if T<M<A for each observed value M in the session data.

The performance of the software product is then determined from the number of vetoed sessions. At 1310, a veto-based health table for the software product is generated by processing the vetoes. A final veto calculation table (e.g. table 340 in FIG. 3) for the software product may be created as a series of joins between data from candidate sessions and column data resulting from vetoes of the candidate sessions. The data in the final veto calculation table may then be aggregated in a data store (e.g., data store 342 in FIG. 3) by unique session identifier to provide a data collection correlated with the vetoes for visualization using visualization software (e.g., software 344 in FIG. 3) as an indication of the function of the software product over time. Also, the telemetry event data from a session that has been vetoed may be functionally joined with corresponding data from a server log using the session identifier for the session to generate a data table.

At 1312, visualization software (e.g., software 344) accesses the data in the veto-based health table to generate dashboard views representative of user experiences with the software product from values stored in the veto-based health table (e.g., see FIGS. 9-11). The performance of the software product may then be viewed from the displayed performance data as, for example, a percentage of vetoed sessions over time. The vetoed session may then be recategorized at 1314 to an owner of the server log data for service issues relating to the vetoed session.

The sessions with no veto thus represent successful sessions ("ideal sessions") and hence successful user experiences. The metric of the ideal sessions is defined as an "ideal session rate" where all the user needs as specified by the user have been met. When one or more of the user needs are not satisfactorily met (e.g., the session is vetoed), the session is classified as a less than ideal session. The ratio of the two is tracked as the ideal session rate. The ideal session rate metric thus leverages the telemetry and focuses on providing actionable information when the user experience is less than ideal. If any save related activity fails, explicit error codes are captured, rather than merely reporting a "save failure." For cases where more than one quality of experience issue occurs in a session, all of the issues are captured to accurately reflect their collective and individual impact. The top buckets of data impacting quality of experience based on the categories and error codes may be used for visibility into where time investment is needed to improve the product. Moreover, even when a latency related metric is not satisfactory, the system will look for failures that may explain the source of the latency. For example, if the overall end to end change latency is unacceptable, the RTC set-up and OCS transition activity may be checked for failures that may explain why fewer edits are being sent over them.

In summary, the ideal session rate metric begins with a list of "sessions" of the online software product 304 that contain a Session_Id that is common among all the different telemetry signals that feed into the telemetry data store 310. As noted above, the field "Session_Id" is a unique GUID that lasts for the lifetime of the process. Each telemetry signal attaches this Session_Id to be joined with other telemetry data for the same session. For server data, a combination of client Session_Id with a server correlation ID is used. This combination is used by server teams to join relevant information that can be directly associated with that client Session_Id. Once the candidate list and veto signals are ready, calculating the session health is a matter of performing a series of left-outer joins on the candidates with each of these signals resulting in a final dataset that either indicates that the candidate session had no vetoes and hence was an ideal experience or that the session was vetoed, whereby one or many of the telemetry signals indicated that the user experience was non-ideal (e.g., outside of the predefined performance metrics). This data is then aggregated into buckets of metadata and counts for display to the user via application 316 as top quality of experience issues to help prioritize the actions to take to improve the user experiences, whether the problems are actual (based on the telemetry data) or perceived by the users (based on manual vetoes from the users).

System Configuration

Techniques described herein may be used with one or more of the computer systems described herein and/or with one or more other systems. For example, the various procedures described herein may be implemented with hardware or software, or a combination of both. For example, the processor, memory, storage, output device(s), input device(s), and/or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 14:
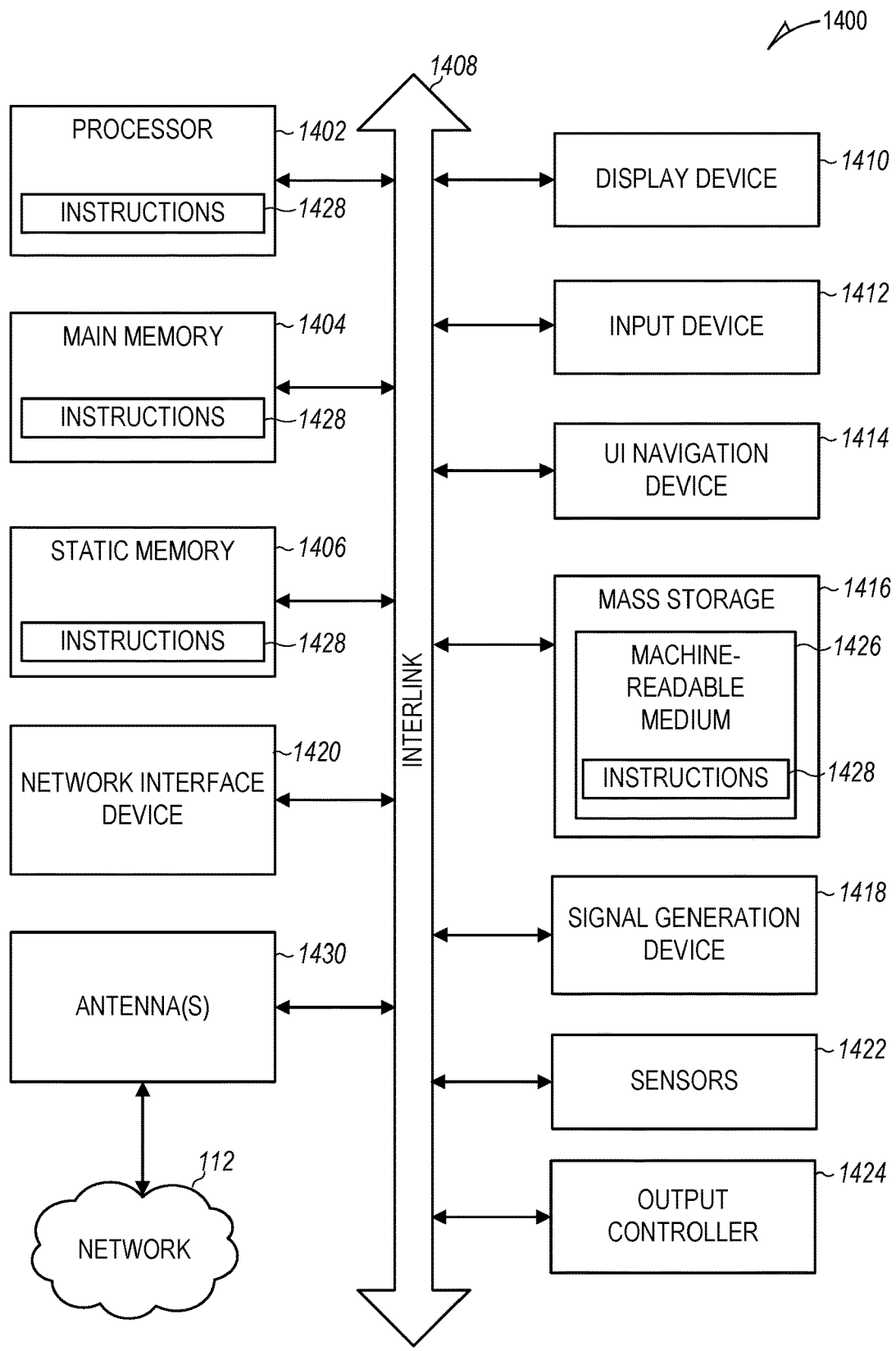
FIG. 14 illustrates a block diagram of an example of a machine upon which one or more embodiments may be implemented.

FIG. 14 illustrates a block diagram of an example machine 1400 that may be used as any or all of elements 310, 318, and 330 in FIG. 3 to implement the veto-based model for measuring product health as described herein. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. In sample embodiments, the machine 1400 as well as the user devices 306 (FIG. 3) may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1400 may serve as a workstation, a front-end server, or a back-end server of an asynchronous communication system as described herein. Machine 1400 may implement the methods described herein by running veto model computation software as described with respect to FIG. 3. Further, while only a single machine 1400 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410 (shown as a video display), an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a mass storage device (e.g., drive unit) 1416, a signal generation device 1418 (e.g., a speaker), a network interface device 1420, and one or more sensors 1422. Example sensors 1422 include one or more of a global positioning system (GPS) sensor, compass, accelerometer, temperature, light, camera, video camera, sensors of physical states or positions, pressure sensors, fingerprint sensors, retina scanners, or other sensors. The machine 1400 may include an output controller 1424, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1416 may include a machine readable medium 1426 on which is stored one or more sets of data structures or instructions 1428 (e.g., software)

embodying or utilized by any one or more of the techniques or functions described herein. The instructions 1428 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the mass storage device 1416 may constitute machine readable media.

While the machine readable medium 1426 is illustrated as a single medium, the term "machine readable medium" may include a single medium or multiple media (e.g., a centralized or distributed database, and/or associated caches and servers) configured to store the one or more instructions 1428.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 1428 may further be transmitted or received over communications network 122 using a transmission medium via the network interface device 1420. The machine 1400 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more physical jacks (e.g., Ethernet, coaxial, or phone jacks) or one or more antennas 1430 to connect to the communications network 306. In an example, the network interface device 1420 may include a plurality of antennas 1430 to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques.

Certain embodiments are described herein as numbered examples 1, 2, 3, etc. These numbered examples are provided as examples only and do not limit the subject technology.

Example 1 is a computer-implemented method of determining the performance of a cloud-based software product over time, comprising collecting telemetry data representing whether different features of online sessions of the software product are operating properly, where the telemetry data represents shared performance metrics of the software product across different participants and components participating in an online session; correlating the collected telemetry data with session identifiers identifying the online session from which the telemetry data was collected; processing the telemetry data for an online session to establish a unit of failure when the telemetry data indicates that the online session operated outside of predefined performance metrics; and determining the performance of the software product as a function of the unit of failure over time.

Example 2 is a method as in Example 1 further comprising defining user experience metrics for the software product, inventorying telemetry data needed for measuring performance of the software product and providing a basis for combining the telemetry data into the shared performance metrics, wherein the unit of failure represents top Quality of Experience issues impacting the shared performance metrics.

Example 3 is a method as in any preceding example wherein collecting telemetry data comprises creating at least one shared performance metric that begins with a candidate list of online sessions of the software product potentially with performance outside of the predefined performance metrics, wherein the candidate list of online sessions contains a session identifier, metadata about the online sessions, and why each online session was chosen as part of a candidate list of online sessions.

Example 4 is a method as in any preceding example wherein processing the telemetry data comprises applying vetoes to the candidate list, where the vetoes are signals provided by at least one of components and owners of the software product that identify a problem and include session identifiers when at least one of the components and a service area behave outside of the predefined performance metrics.

Example 5 is a method as in any preceding example further comprising combining a number of online sessions potentially invalidated with a multitude of vetoes to generate the unit of failure.

Example 6 is a method as in any preceding example further comprising translating percentiles to vetoes by selecting a set of session data with observed values M, defining a veto with a maximum target metric value T at a specific percentile P, computing an actual metric value A of the session data at percentile P, and producing a veto if $T<M<A$ for each observed value M in the session data.

Example 7 is a method as in any preceding example wherein processing the telemetry data comprises identifying online sessions that have been marked as possibly not operating properly by vetoes and determining whether the identified online sessions satisfy the unit of failure, wherein performance of the software product is calculated as a function of the vetoes.

Example 8 is a method as in any preceding example further comprising generating a veto-based health table for the software product from processing of the vetoes and generating, using visualization software, dashboard views representative of user experiences with the software product from values stored in the veto-based health table.

Example 9 is a method as in any preceding example further comprising creating a final veto calculation table for the software product as a series of joins between data from online sessions and column data resulting from vetoes of the online sessions and aggregating data in the final veto calculation table by unique session identifier to provide a data collection correlated with the vetoes for visualization as an indication of the function of the software product over time.

Example 10 is a method as in any preceding example wherein processing the telemetry data comprises functionally joining telemetry event data from an online session that has been vetoed with corresponding data from a server log using the session identifier for the online session to generate a data table, and recategorizing the vetoed session to an owner of the server log data for service issues relating to the vetoed session.

Example 11 is a system for determining the performance of a cloud-based software product over time, comprising processing circuitry including at least one processor; and a memory device having instructions stored therein, wherein the instructions, which when executed by the processing circuitry, configure the at least one processor to: collect telemetry data representing whether different features of online sessions of the software product are operating properly, where the telemetry data represents shared performance metrics of the software product across different participants and components participating in an online session; correlate the collected telemetry data with session identifiers identifying the online session from which the telemetry data was collected; process the telemetry data for the online session to establish a unit of failure when the telemetry data indicates that the online session operated outside of predefined performance metrics; and determine the performance of the software product as a function of the unit of failure over time.

Example 12 is a system as in example 11 further comprising an interface device through which a user may define user experience metrics for the software product, specify telemetry data needed for measuring performance of the software product and provide a basis for combining the telemetry data into the shared performance metrics, wherein the unit of failure represents top Quality of Experience issues impacting the shared performance metrics.

Example 13 is a system as in examples 11 or 12 wherein the processing circuitry is further configured to create at least one shared performance metric that begins with a candidate list of online sessions of the software product potentially with performance outside of the predefined performance metrics, wherein the candidate list of online sessions contains a session identifier, metadata about the online sessions, and why each online session was chosen as part of a candidate list of online sessions.

Example 14 is a system as in examples 11 to 13 wherein the processing circuitry is further configured to apply vetoes to the candidate list, where the vetoes are signals provided by at least one of components and owners of the software product that identify a problem and include session identifiers when at least one of the components and a service area behave outside of the predefined performance metrics.

Example 15 is a system as in examples 11 to 14 wherein the processing circuitry is further configured to combine a number of online sessions potentially invalidated with a multitude of vetoes to generate the unit of failure.

Example 16 is a system as in examples 11 to 15 wherein the processing circuitry is further configured to identify online sessions that have been marked as possibly not operating properly by vetoes and determining whether the identified online sessions satisfy the unit of failure, wherein performance of the software product is calculated as a function of the vetoes.

Example 17 is a system as in examples 11 to 16 wherein the processing circuitry is further configured to generate a veto-based health table for the software product from processing of the vetoes, further comprising visualization software that generates dashboard views representative of user experiences with the software product from values stored in the veto-based health table.

Example 18 is a system as in examples 11 to 17 wherein the processing circuitry is further configured to functionally join telemetry event data from an online session that has been vetoed with corresponding data from a server log using the session identifier for the online session to generate a data table, and to recategorize the vetoed session to an owner of the server log data for service issues relating to the vetoed session.

Example 19 is a non-transitory machine-readable medium having instructions stored thereon that when executed by one or more processors cause the one or more processors to implement a method of determining the performance of a cloud-based software product over time, the method including: collecting telemetry data representing whether different features of online sessions of the software product are operating properly, where the telemetry data represents shared performance metrics of the software product across different participants and components participating in an online session; correlating the collected telemetry data with session identifiers identifying the online session from which the telemetry data was collected; processing the telemetry data for the online session to establish a unit of failure when the telemetry data indicates that the online session operated outside of predefined performance metrics; and determining the performance of the software product as a function of the unit of failure over time.

Example 20 is a medium as in example 19 wherein the instructions include instructions to cause the one or more processors to identify online sessions that have been marked as possibly not operating properly by vetoes and determining whether the identified online sessions satisfy the unit of failure, wherein performance of the software product is calculated as a function of the vetoes.

Alternative implementations of the veto-based system for measuring product health described herein are contemplated. For example, the veto-based system described herein may be implemented within or in association with a number of online products and services including an email application (e.g., Outlook), a social media application, a collaboration platform, or any other platform where an online software product is used by one or more individuals via an Internet or other network connection. Thus, the veto-based system is not to be limited to the online co-authoring system described in specific examples. These and other implementations are included within the context of the disclosed embodiments as set forth in the following claims.

In the above Detailed Description, various features may be grouped together to streamline the disclosure. However, the claims may not set forth every feature disclosed herein as embodiments may feature a subset of the features. Further, embodiments may include fewer features than those disclosed in a particular example. Also, although the subject matter has been described in language specific to structural features and/or methodological acts with respect to a particular graphical user interface, it is to be understood that the subject matter defined in the appended claims is not necessarily limited to the specific embodiments, features, or acts described above. Rather, the specific embodiments, features, and acts described above are disclosed as example forms of implementing the claims. Thus, the following claims are hereby incorporated into the Detailed Description, with a claim standing on its own as a separate embodiment.

What is claimed is:

1. A computer-implemented method of determining the performance of a cloud-based software product over time, comprising:
collecting telemetry data representing whether different features of online sessions of the software product are operating properly, where the telemetry data represents shared performance metrics of participant experiences with the software product across different participants and components participating in an online session;
correlating the collected telemetry data with session identifiers identifying the online session from which the telemetry data was collected;
processing the telemetry data for an online session to establish a unit of failure when the telemetry data indicates that the online session operated outside of predefined performance metrics wherein processing the telemetry data comprises applying vetoes to a candidate list of online sessions of the software product, wherein collecting telemetry data comprises creating at least one shared performance metric that begins with the candidate list of online sessions of the software product potentially with performance outside of the predefined performance metrics, wherein the candidate list of online sessions contains a session identifier, metadata about the online sessions, and why each online session was chosen as part of a candidate list of online sessions; and
determining the performance of the software product as a function of the unit of failure over time.

2. A method as in claim 1, further comprising defining participant experience metrics for the software product, inventorying telemetry data needed for measuring performance of the software product and providing a basis for combining the telemetry data into the shared performance metrics, wherein the unit of failure represents top Quality of Experience issues impacting the shared performance metrics.

3. A method as in claim 1, wherein processing the telemetry data comprises applying vetoes to the candidate list, where the vetoes are signals provided by at least one of components and owners of the software product that identify a problem and include session identifiers when at least one of the components and a service area behave outside of the predefined performance metrics.

4. A method as in claim 3, further comprising combining a number of online sessions potentially invalidated with a multitude of vetoes to generate the unit of failure.

5. A method as in claim 3, further comprising translating percentiles to vetoes by selecting a set of session data with observed values M, defining a veto with a maximum target metric value T at a specific percentile P, computing an actual metric value A of the session data at percentile P, and producing a veto if $T<M<A$ for each observed value M in the session data.

6. A method as in claim 1, wherein processing the telemetry data comprises identifying online sessions that have been marked as possibly not operating properly by vetoes and determining whether the identified online sessions satisfy the unit of failure, wherein performance of the software product is calculated as a function of the vetoes.

7. A method as in claim 6, further comprising:
generating a veto-based health table for the software product from processing of the vetoes and
generating, using visualization software, dashboard views representative of participant experiences with the software product from values stored in the veto-based health table.

8. A method as in claim 6, further comprising creating a final veto calculation table for the software product as a series of joins between data from online sessions and column data resulting from vetoes of the online sessions and aggregating data in the final veto calculation table by unique session identifier to provide a data collection correlated with the vetoes for visualization as an indication of the function of the software product over time.

9. A method as in claim 6, wherein processing the telemetry data comprises functionally joining telemetry event data from an online session that has been vetoed with corresponding data from a server log using the session identifier for the online session to generate a data table, and recategorizing the vetoed session to an owner of the server log data for service issues relating to the vetoed session.

10. A system for determining the performance of a cloud-based software product over time, comprising:
processing circuitry including at least one processor; and
a memory device having instructions stored therein, wherein the instructions, which when executed by the processing circuitry, configure the at least one processor to:
collect telemetry data representing whether different features of online sessions of the software product are operating properly, where the telemetry data represents shared performance metrics of participant experiences with the software product across different participants and components participating in an online session;
correlate the collected telemetry data with session identifiers identifying the online session from which the telemetry data was collected;
process the telemetry data for the online session to establish a unit of failure when the telemetry data indicates that the online session operated outside of predefined performance metrics wherein processing the telemetry data comprises applying vetoes to a candidate list, wherein collecting telemetry data comprises creating at least one shared performance metric that begins with the candidate list of online sessions of the software product potentially with performance outside of the predefined performance metrics, wherein the candidate list of online sessions contains a session identifier, metadata about the online sessions, and why each online session was chosen as part of a candidate list of online sessions; and
determine the performance of the software product as a function of the unit of failure over time.

11. A system as in claim 10, further comprising an interface device through which a participant may define participant experience metrics for the software product, specify telemetry data needed for measuring performance of the software product and provide a basis for combining the telemetry data into the shared performance metrics, wherein the unit of failure represents top Quality of Experience issues impacting the shared performance metrics.

12. A system as in claim 10, wherein the processing circuitry is further configured to apply vetoes to the candidate list, where the vetoes are signals provided by at least one of components and owners of the software product that identify a problem and include session identifiers when at least one of the components and a service area behave outside of the predefined performance metrics.

13. A system as in claim 12, wherein the processing circuitry is further configured to combine a number of online sessions potentially invalidated with a multitude of vetoes to generate the unit of failure.

14. A system as in claim 10, wherein the processing circuitry is further configured to identify online sessions that have been marked as possibly not operating properly by vetoes and determining whether the identified online sessions satisfy the unit of failure, wherein performance of the software product is calculated as a function of the vetoes.

15. A system as in claim 14, wherein the processing circuitry is further configured to generate a veto-based health table for the software product from processing of the vetoes, further comprising visualization software that generates dashboard views representative of participant experiences with the software product from values stored in the veto-based health table.

16. A system as in claim 14, wherein the processing circuitry is further configured to functionally join telemetry event data from an online session that has been vetoed with corresponding data from a server log using the session identifier for the online session to generate a data table, and to recategorize the vetoed session to an owner of the server log data for service issues relating to the vetoed session.

17. A non-transitory machine-readable medium having instructions stored thereon that when executed by one or more processors cause the one or more processors to implement a method of determining the performance of a cloud-based software product over time, the method including:
    collecting telemetry data representing whether different features of online sessions of the software product are operating properly, where the telemetry data represents shared performance metrics of participant experiences with the software product across different participants and components participating in an online session;
    correlating the collected telemetry data with session identifiers identifying the online session from which the telemetry data was collected;
    processing the telemetry data for the online session to establish a unit of failure when the telemetry data indicates that the online session operated outside of predefined performance metrics wherein processing the telemetry data comprises applying vetoes to a candidate list, wherein collecting telemetry data comprises creating at least one shared performance metric that begins with the candidate list of online sessions of the software product potentially with performance outside of the predefined performance metrics, wherein the candidate list of online sessions contains a session identifier, metadata about the online sessions, and why each online session was chosen as part of a candidate list of online sessions; and
    determining the performance of the software product as a function of the unit of failure over time.

18. A medium as in claim 17, wherein the instructions include instructions to cause the one or more processors to identify online sessions that have been marked as possibly not operating properly by vetoes and determining whether the identified online sessions satisfy the unit of failure, wherein performance of the software product is calculated as a function of the vetoes.

* * * * *